(12) United States Patent
Utsumi et al.

(10) Patent No.: US 7,363,904 B2
(45) Date of Patent: Apr. 29, 2008

(54) LUBRICATION DEVICE OF ENGINE

(75) Inventors: Yoji Utsumi, Shizuoka (JP); Masahiro Ito, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 435 days.

(21) Appl. No.: 10/503,457

(22) PCT Filed: Feb. 14, 2003

(86) PCT No.: PCT/JP03/01604

§ 371 (c)(1),
(2), (4) Date: Aug. 2, 2004

(87) PCT Pub. No.: WO03/071102

PCT Pub. Date: Aug. 28, 2003

(65) Prior Publication Data

US 2005/0150725 A1    Jul. 14, 2005

(30) Foreign Application Priority Data

Feb. 20, 2002   (JP) .............................. 2002-043834

(51) Int. Cl.
  *F01M 1/02*   (2006.01)
  *F01M 9/10*   (2006.01)
  *F01M 11/02*  (2006.01)
(52) U.S. Cl. ........................... 123/196 R; 123/196 CP; 184/6.5
(58) Field of Classification Search ............ 123/196 R, 123/179.25, 195 R, 196 CP; 184/6.5, 6.12
See application file for complete search history.

(56) References Cited

U.S. PATENT DOCUMENTS 5,092,292 A * 3/1992 Iguchi et al. ........... 123/196 R (Continued)

FOREIGN PATENT DOCUMENTS

JP          61-72813          4/1986

(Continued)

*Primary Examiner*—Stephen K. Cronin
*Assistant Examiner*—Ka Chun Leung
(74) *Attorney, Agent, or Firm*—Hogan & Hartson LLP

(57) ABSTRACT

An engine lubrication system in which a transmission 13 having a main shaft 14 and a drive shaft 15 each having a plurality of change-speed gears mounted thereon is arranged within a separate-type crankcase which is separated into left and right case portions, characterized in that a connecting bolt 60 for connecting the left and right case portions 2a, 2b together is inserted to be disposed in the vicinity of the main shaft 14 or the drive shaft 15 and in parallel with the shafts, in that left and right boss portions 60c having bolt bores 60a into which the connecting bolt 60 for connecting the left and right case portions 2a, 2b together is inserted are extended in a tubular fashion so as to abut with each other face-to-face, in that a space between an inner circumferential surface of the bolt bore 60a in the left and right boss portions 60c and an outer circumferential surface of the connecting bolt 60 is made to constitute a lubricating oil passageway 15a, in that an end of the lubricating oil passageway 15a is connected to a lubricating oil supply source, and in that lubricating oil supply holes 60b directed to the change-speed gears of the transmission are formed in the boss portions 60c in such a manner as to branch off from the lubricating oil supply passageway 15a.

6 Claims, 19 Drawing Sheets

U.S. PATENT DOCUMENTS

| | | | |
|---|---|---|---|
| 5,495,833 A * | 3/1996 | Ishizaka et al. | 123/179.25 |
| 5,579,729 A * | 12/1996 | Batzill et al. | 123/55.5 |
| 6,332,444 B1 * | 12/2001 | Narita et al. | 123/196 R |
| 6,334,422 B1 * | 1/2002 | Sumi et al. | 123/196 R |
| 6,497,211 B2 * | 12/2002 | Nomura et al. | 123/195 R |
| 6,871,620 B2 * | 3/2005 | Aimone | 123/90.17 |
| 7,089,905 B2 * | 8/2006 | Tsutsumi et al. | 123/196 R |
| 2002/0043237 A1 * | 4/2002 | Nomura et al. | 123/196 R |
| 2003/0188704 A1 * | 10/2003 | Aimone | 123/90.17 |
| 2005/0039718 A1 * | 2/2005 | Tsutsumi et al. | 123/196 R |
| 2005/0150725 A1 * | 7/2005 | Utsumi et al. | 184/6.5 |

FOREIGN PATENT DOCUMENTS

| | | |
|---|---|---|
| JP | A-61-72813 | 4/1986 |
| JP | 1-164864 | 6/1989 |
| JP | 3-102007 | 10/1991 |
| JP | B-6-27494 | 4/1994 |
| JP | 2001-073732 | 3/2001 |
| JP | 2001-73732 A * | 3/2001 |

* cited by examiner

LEFT-HAND SIDE VIEW

LEFT-HAND SIDE VIEW

RIGHT-HAND SIDE VIEW

RIGHT-HAND SIDE VIEW

LEFT-HAND SIDE VIEW

ARROW A VIEW

LUBRICATION DEVICE OF ENGINE

TECHNICAL FIELD

The present invention relates to an engine lubrication system and more particularly to an engine lubrication system adapted to effectively perform the lubrication of a transmission disposed within a crankcase with a simple construction.

BACKGROUND ART

Conventionally, as an engine lubrication system, there exists an engine lubrication system in which an oil supply passageway is formed in a main shaft and a drive shaft of a transmission, respectively, lubricating oil is supplied into the oil supply passageways by a lubricating oil pump and the lubricating oil so supplied is then supplied to sliding surfaces of the shafts over which change-speed gears slide from branch holes formed in the main shaft and the drive shaft, whereby the sliding surfaces are lubricated.

Incidentally, in lubricating the transmission, while it is important to lubricate meshing surfaces of the change-speed gears, conventionally, it is a generally adopted method in which part of the change-speed gears is submerged in lubricating oil stored within a transmission case, whereby the meshing surfaces are lubricated.

In the method in which lubricating oil is stored within the transmission case, however, a resistance generated when the change-speed gears stir the lubrication oil cannot be ignored, and there is also caused a problem that the deterioration of lubricating oil is promoted.

Then, as is described in, for example, JP-B-6-27494, there is provided an engine lubrication system in which lubricating oil is supplied directly to meshing surfaces of the change-speed gears. In this related art, a main shaft 13 and a drive shaft 14 are disposed on separate mating surfaces of a crankcase 1 which is divided vertically into an upper case 2 and a lower case 3, a by-pass tube 36 for establishing communication between lubricating oil passageways 34 and 35 which are formed in axial side walls is arranged in parallel with the main shaft and the like in the upper case 2, and an injection port 38 is formed in the by-pass tube 36 for supplying lubricating oil to groups of change-speed gears.

In this related art described in the Japanese Examined Patent Publication, however, since a construction is adopted in which the by-pass tube 36 constituted by a separate part is disposed, the number of parts is increased by the addition of the by-pass tube 36, and a space where the by-pass tube 36 is disposed needs to be secured, leading to a possibility that the enlargement of the crankcase is called for. Furthermore, since a construction is adopted in which the by-pass tube 36 is inserted from the outside of the crankcase into the upper case 2, sealing needs to be provided between the by-pass tube 36 and an insertion hole, resulting in a problem that the construction is made complex.

The invention was made in view of the problems inherent in the related art and an object thereof is to provide an engine lubrication system which can implement the lubrication of meshing portions of change-speed gears of a transmission easily and securely without causing the problems that the construction is made complex and that the number of parts is increased.

DISCLOSURE OF THE INVENTION

According to a first aspect of the invention, there is provided an engine lubrication system in which a transmission having a main shaft and a drive shaft each having a plurality of change-speed gears mounted thereon is arranged within a separate-type crankcase which is separated into left and right case portions, characterized in that a connecting bolt for connecting the left and right case portions together is inserted to be disposed in the vicinity of the main shaft or the drive shaft and in parallel with the shafts, in that left and right boss portions having bolt bores into which the connecting bolt for connecting the left and right case portions together is inserted are extended in a tubular fashion so as to abut with each other face-to-face, in that a space between an inner circumferential surface of the bolt bore in the left and right boss portions and an outer circumferential surface of the connecting bolt is made to constitute a lubricating oil passageway, in that an end of the lubricating oil passageway is connected to a lubricating oil supply source, and in that lubricating oil supply holes directed to the change-speed gears of the transmission are formed in the boss portions in such a manner as to branch off from the lubricating oil supply passageways.

According to a second aspect of the invention, there is provided an engine lubrication system as set forth in the first aspect of the invention, characterized in that the connecting bolt and the tubular boss portions are disposed above intermediate portions of the main shaft and the drive shaft, and in that the lubricating oil supply holes are formed so as to be directed toward the change-speed gears on the main shaft and the drive shaft.

According to a third aspect of the invention, there is provided an engine lubrication system as set forth in the first or second aspect of the invention, characterized in that the connecting bolt is inserted from a side where a clutch compartment for accommodating therein a clutch mechanism resides so as to be screwed into a wall surface of the opposed case portion, with a head portion of the connecting bolt being situated on a clutch compartment side.

According to a fourth aspect of the invention, there is provided an engine lubrication system as set forth in the third aspect of the invention, characterized in that a lubricating oil supply port is formed in a screwed side of the connecting bolt, whereas a lubricating oil discharge port is formed in a head portion side thereof.

According to a fifth aspect of the invention, there is provided an engine lubrication system as set forth in the fourth aspect of the invention, characterized in that a portion of the bolt bore which is situated immediately close to the head portion of the connecting bolt is formed smaller in diameter so that a gap between the portion and the connecting bolt becomes narrower than one along a portion thereof which correspond to the lubricating oil passageway.

According to a sixth aspect of the invention, there is provided an engine lubrication system as set forth in the fourth or fifth aspect of the invention, characterized in that the lubricating oil discharge port is made to communicate with an in-drive shaft lubricating oil passageway formed within the drive shaft and in that the in-drive shaft lubricating oil passageway is made to communicate with sliding surfaces of the change-speed gears through a lubricating oil supply hole.

According to a seventh aspect of the invention, there is provided an engine lubrication system as set forth in any of the fourth to sixth aspects of the invention, characterized in that a lubricating oil supply port side portion of the lubricating oil passageway is made to communicate with an in-main shaft lubricating oil passageway formed within the main shaft and in that the in-main shaft lubricating oil passageway is made to communicate with the sliding surfaces of the change-speed gears through a lubricating oil supply hole.

BEST MODE FOR CARRYING OUT THE INVENTION

Figure 1:
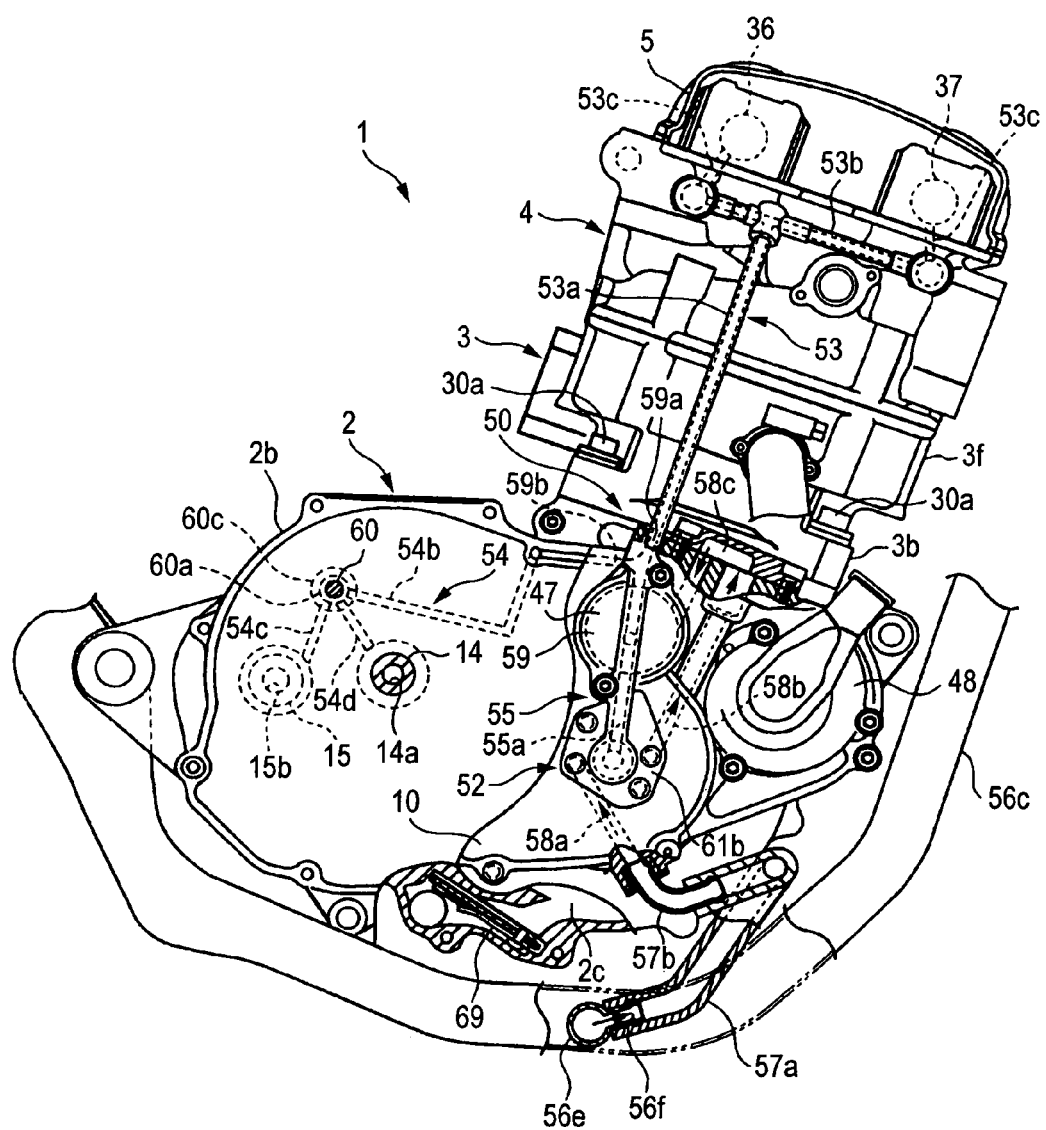
FIG. 1 is a right-hand side view of an engine according to an embodiment of the invention.
Figure 2:
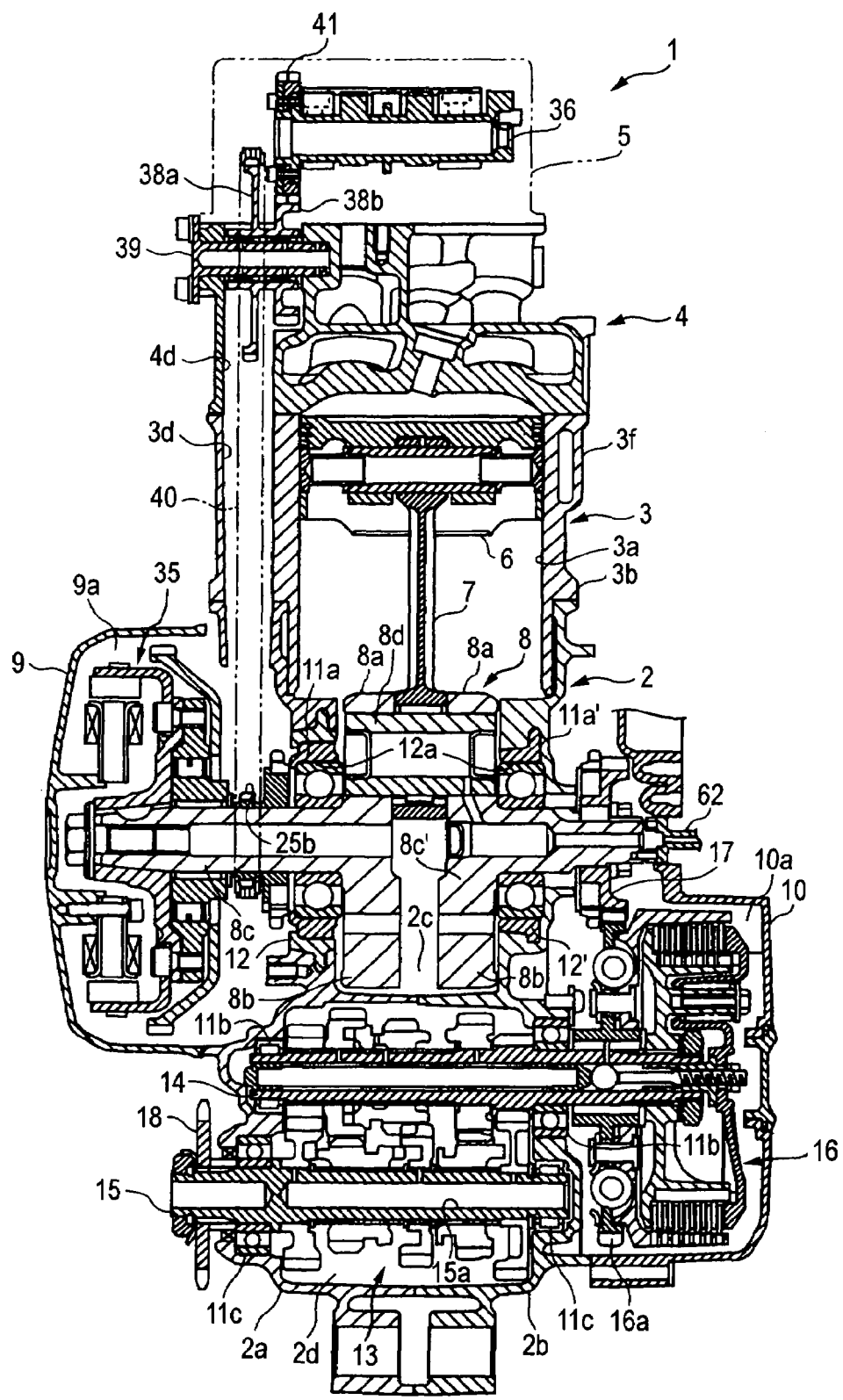
FIG. 2 is a sectional plan view showing a development of the engine.

Hereinafter, an embodiment of the invention will be described with reference to the accompanying drawings.

FIGS. 1 to 21 are drawings for describing an embodiment of the invention. In the drawings, reference numeral 1 denotes a water-cooled, 4-cycle, single cylinder, 5-valve engine, and in general, the engine has a construction in which a cylinder body 3, a cylinder head 4 and a cylinder head cover 5 are stacked on and fastened to a crankcase 2, and a piston 6 slidably disposed in a cylinder bore 3a in the cylinder body 3 is connected to a crankshaft 8 via a connecting rod 7.

The cylinder body 3 and the crankcase 2 are securely connected together by screwing four case bolts 30a which pass through a lower flange portion (a case side flange portion) 3b into a cylinder side mating surface 2e of the crankcase 2. To be more specific, the case bolts 30a are screwed into bolt connecting portions (connecting boss portions) 12c of iron alloy bearing brackets 12, 12' (which will be described later on) embedded in left and right wall portions of the aluminum alloy crankcase 2, respectively, through insert casting. Note that reference numeral 31a denotes a positioning dowel pin for positioning the crankcase 2 and the cylinder body 3.

In addition, the cylinder body 3 and the cylinder head 4 are connected together with two short head bolts 30b and four long head bolts 30c. The short head bolt 30b is screwed to be planted in a portion below an induction port 4c and a portion below an exhaust port in the cylinder head 4, extends downwardly to pass through an upper flange portion 3f of the cylinder block 3 and protrudes downwardly therefrom. Then, a cap nut 32a is screwed on the downwardly protruding portion of the short head bolt 30b, whereby the upper flange portion 3f and hence the cylinder body 3 are fastened to a cylinder side mating surface 4a of the cylinder head 4.

In addition, the long head bolt 30c is screwed to be planted in the lower flange portion 3b of the cylinder body 3, extends upwardly to pass from the upper flange portion 3f of the cylinder block 3 through a flange portion 4b of the cylinder head 4 and protrudes upwardly therefrom. Then, a cap nut 32b is screwed on the upwardly protruding portion of the long head bolt 30c, whereby the lower flange portion 3b and hence the cylinder body are fastened to the cylinder side mating surface 4a of the cylinder head 4.

Thus, in connecting the cylinder body 3 and the cylinder head 4 together, since not only the upper flange portion 3f of the cylinder body 3 is fastened to be fixed to the cylinder head 4 with the short head bolts 30b and the cap nuts 32 but also the long head bolts 30c are planted in the lower flange portion 3b which is fastened to be securely connected to the mating surface 2e of the crankcase 2, so that the cylinder body 3 is fastened to be fixed to the flange portion 4b of the cylinder head 4 with the long head bolts 30c and the cap nuts 32b, a tensile load generated by a combustion pressure comes to be borne by the cylinder body 3 and the four long head bolts 30c, so that a load applied to the cylinder body 3 can be reduced accordingly or by such an extent that the load is so borne by the cylinder body 3 and the long head bolts 30c. As a result, a stress generated at, in particular, an axially intermediate portion of the cylinder body 3 can be reduced, thereby making it possible to secure a required durability even in case the thickness of the cylinder body 3 is reduced.

Incidentally, in the event that only the upper flange portion 3f of the cylinder body 3 is connected to the cylinder head 4, an excessively large tensile stress is generated at the axially intermediate portion of the cylinder body 3, and in an extreme case, there occurs a concern that a crack is generated at the portion in question. In the embodiment, however, the generation of the excessively large stress at the intermediate portion of the cylinder body can be avoided due to the presence of the long head bolts 30c, thereby making it possible to prevent the generation of a crack.

In addition, in planting the long head bolts 30c in the lower flange portion 3b, since the long head bolts are disposed in the vicinity of the crankcase fastening case bolts 30a, respectively, the load generated by the combustion pressure can be transmitted from the cylinder head 4 to the crankcase 2 via the long head bolts 30c and the cylinder body in an ensured fashion, thereby making it possible to improve the durability against the load in this respect.

Figure 5:
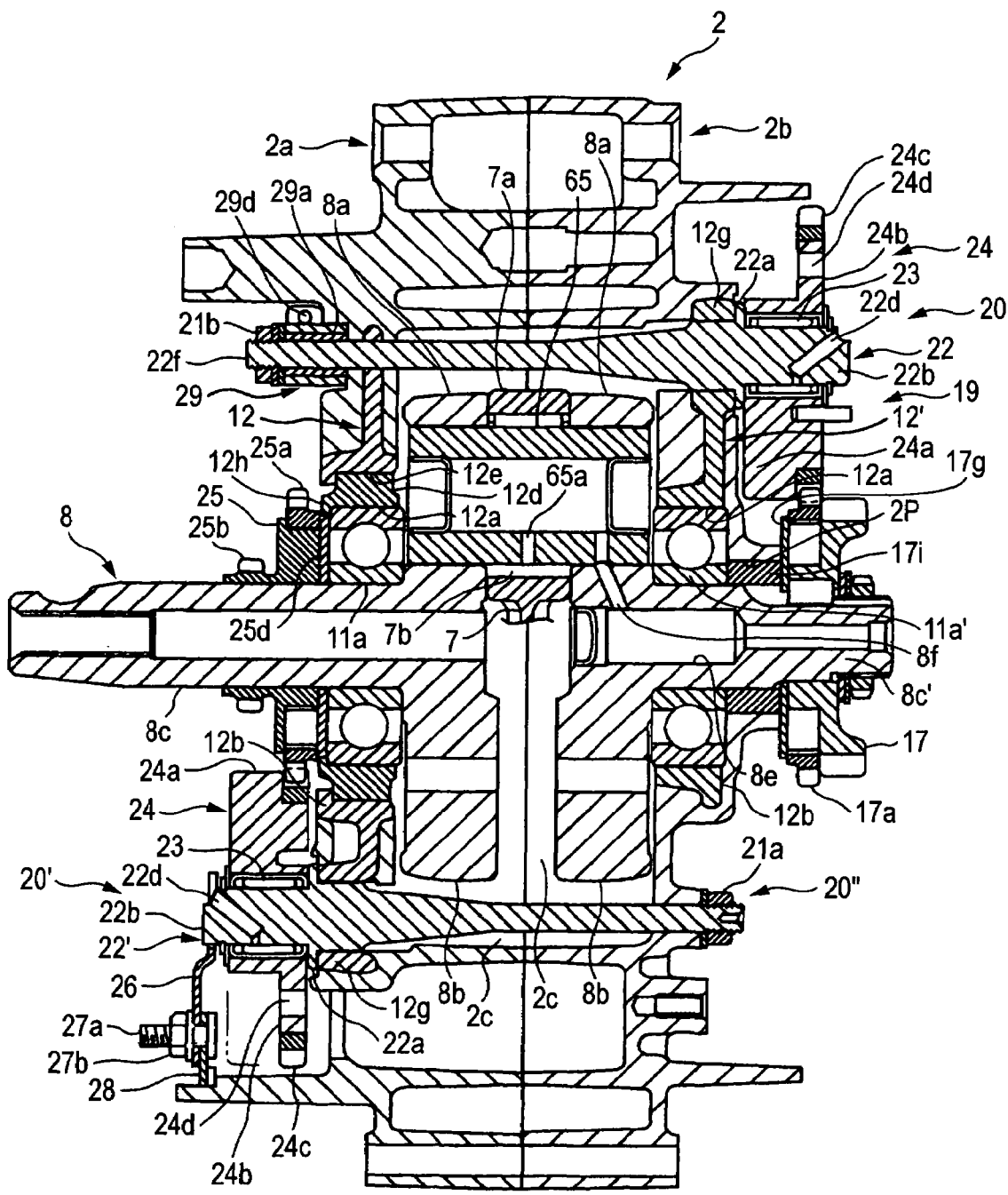
FIG. 5 is a sectional plan view showing a development of a balance shaft of the engine.
Figure 6:
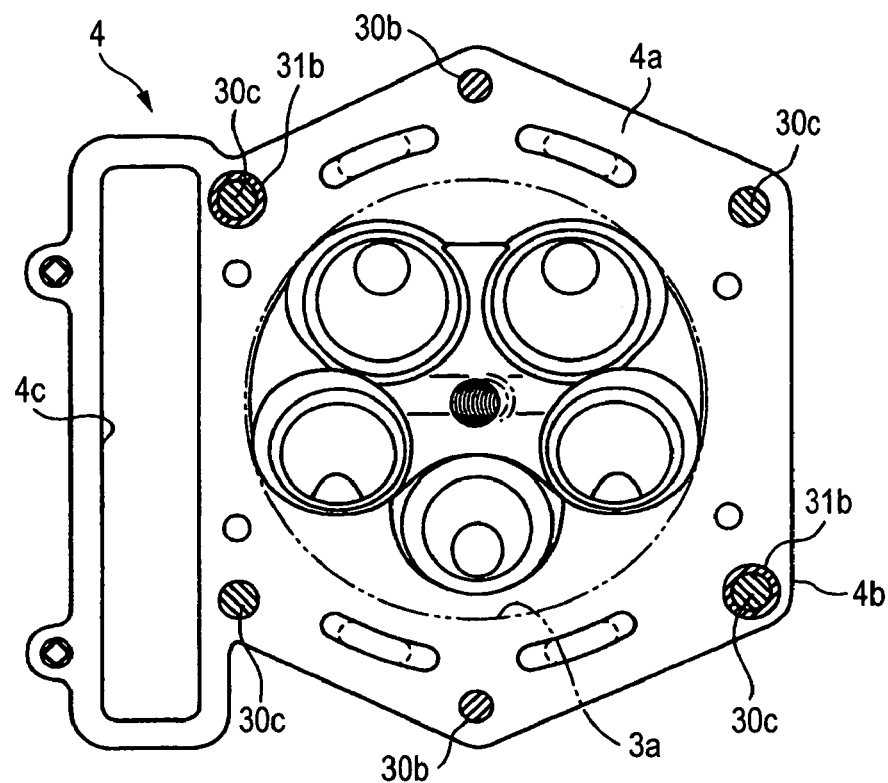
FIG. 6 is a bottom view of a cylinder head of the engine.
Figure 7:
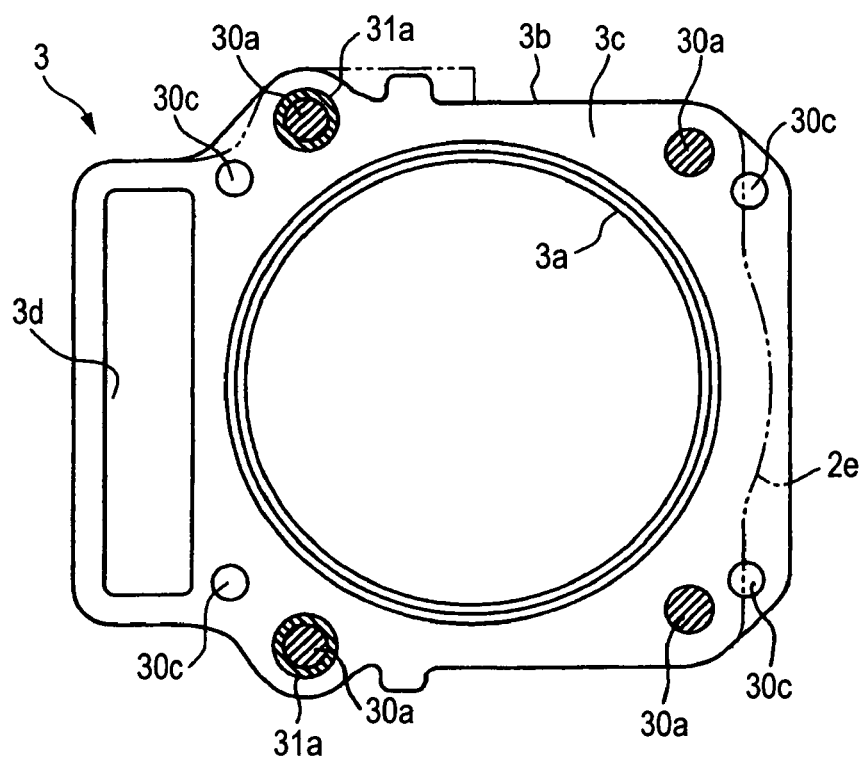
FIG. 7 is a bottom view of a cylinder body of the engine.
Figure 8:
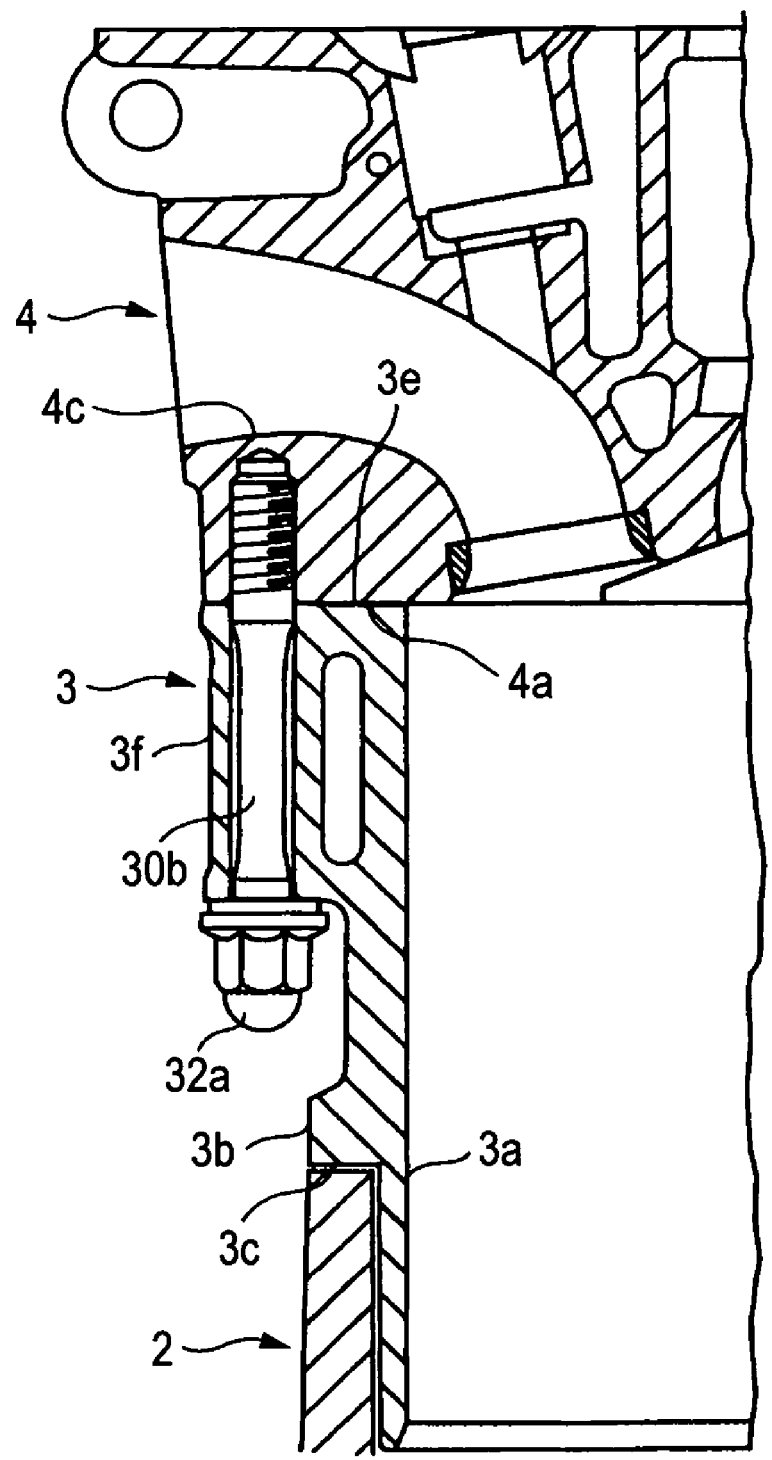
FIG. 8 is a sectional side view showing a portion where the cylinder head of the engine is connected to the cylinder body.
Figure 9:
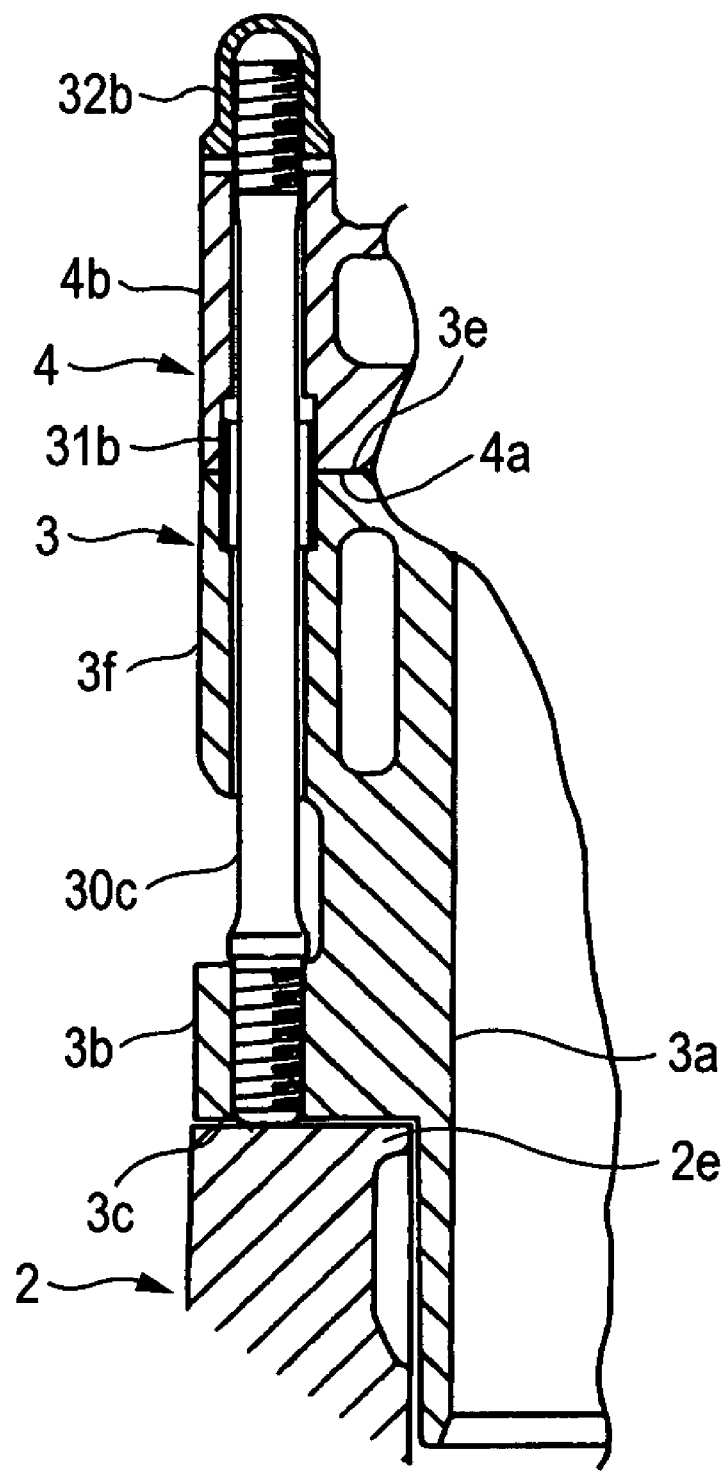
FIG. 9 is a sectional side view showing a portion where the cylinder body of the engine is connected to the crankcase.
Figure 10:
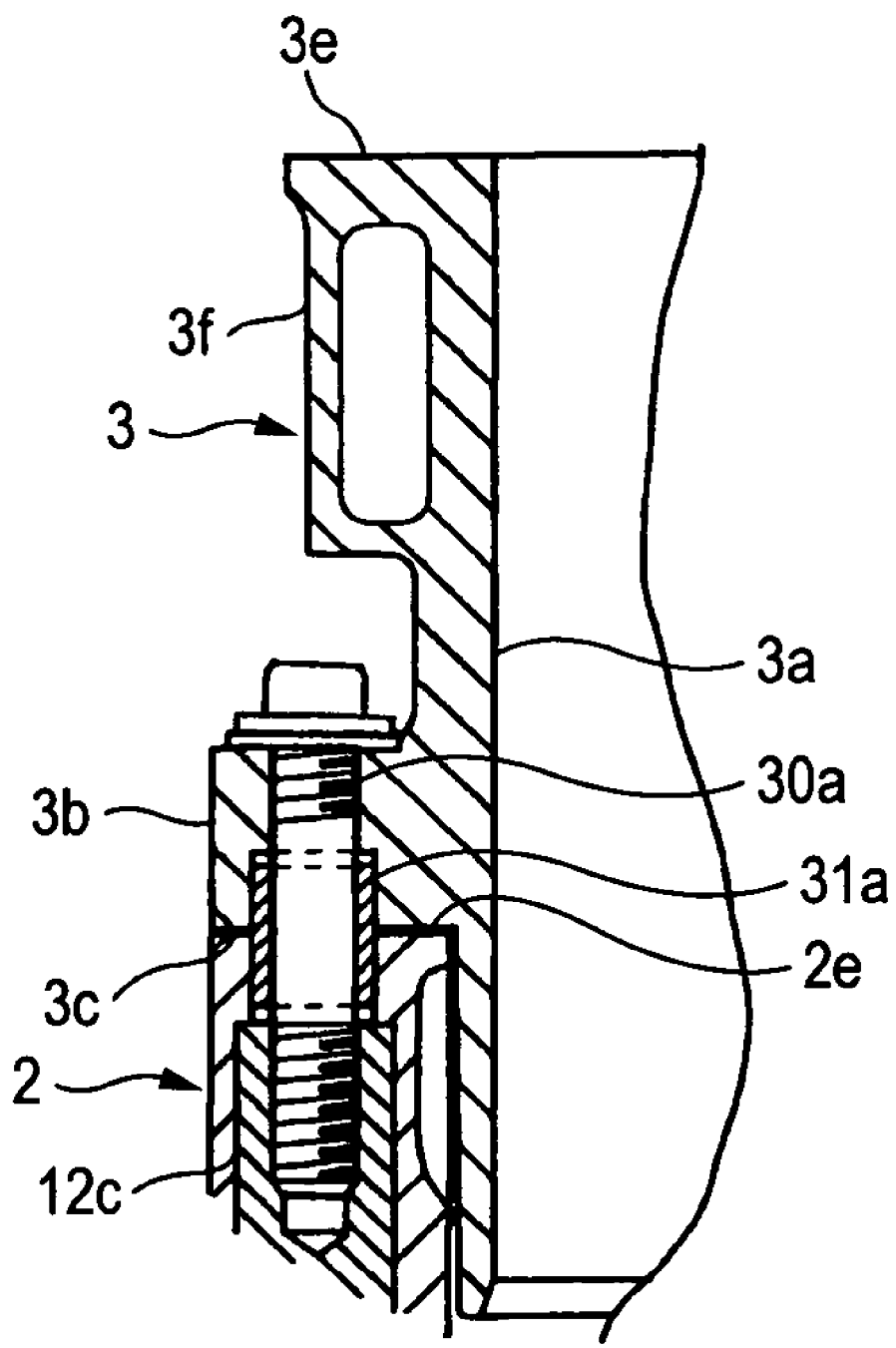
FIG. 10 is another sectional side view showing a portion where the cylinder body of the engine is connected to the crankcase.
Figure 16:
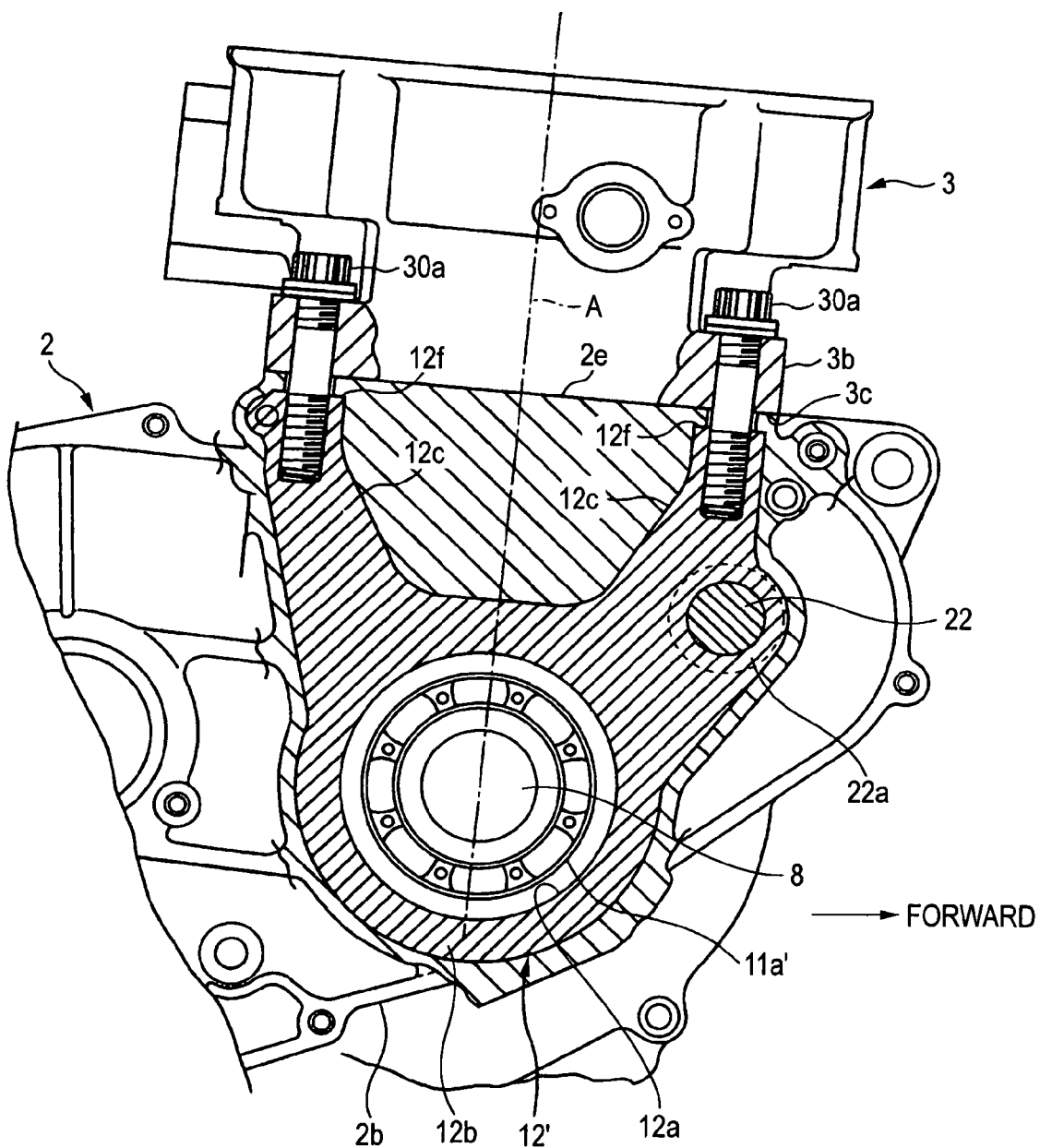
FIG. 16 is a sectional right-hand side view of a bearing bracket of the engine.

Here, the right-side bearing bracket 12' has, as shown in FIGS. 5, 16, a boss portion 12b in which the right-side bearing 11a' of the crankshaft 8 is inserted to be fitted in the bearing hole 12a through press fit. Then, the bolt connecting portions 12c, 12c extend upwardly from front and rear portions which hold the crankshaft 8 therebetween as seen in a direction in which the crankshaft 8 extends to the vicinity of the cylinder-side mating surface of the crankcase 2.

Figure 17:
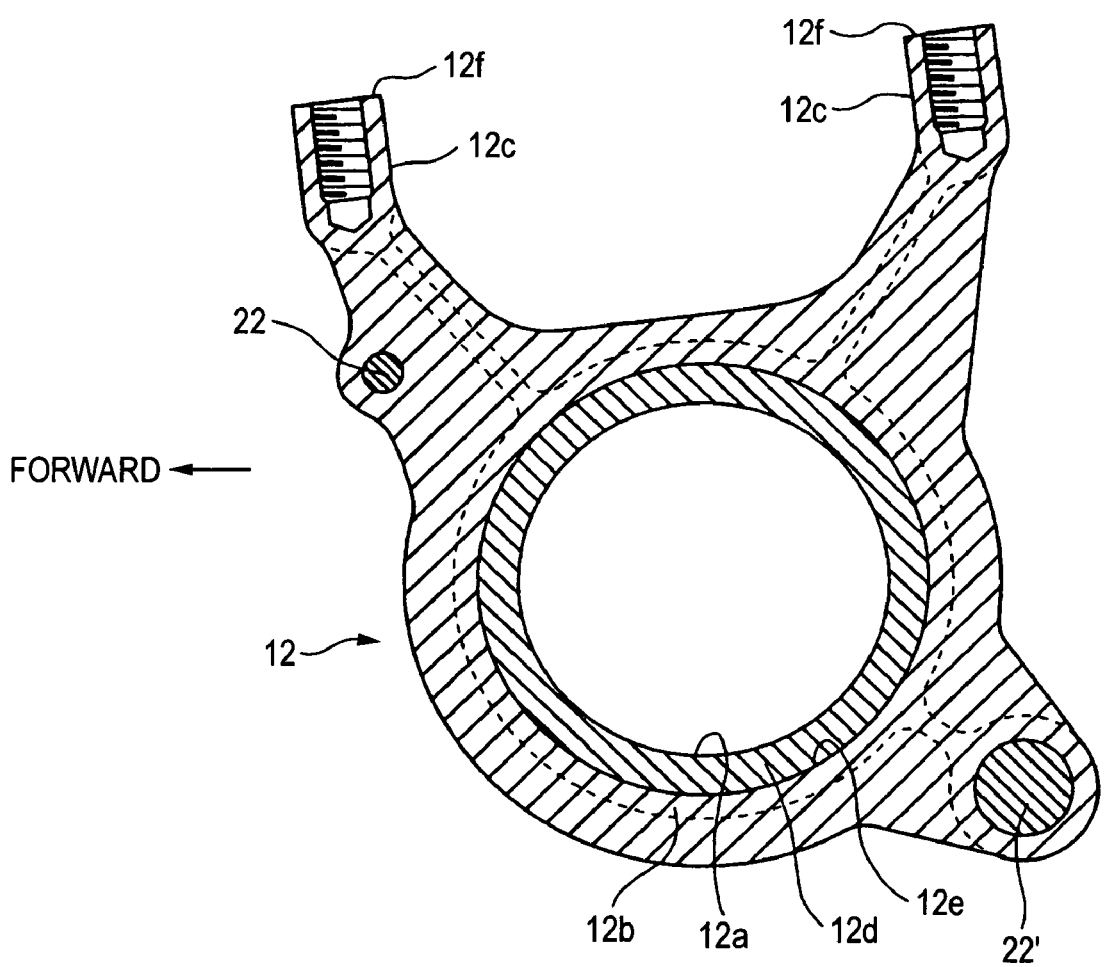
FIG. 17 is a sectional left-hand side view of a bearing bracket.
Figure 18:
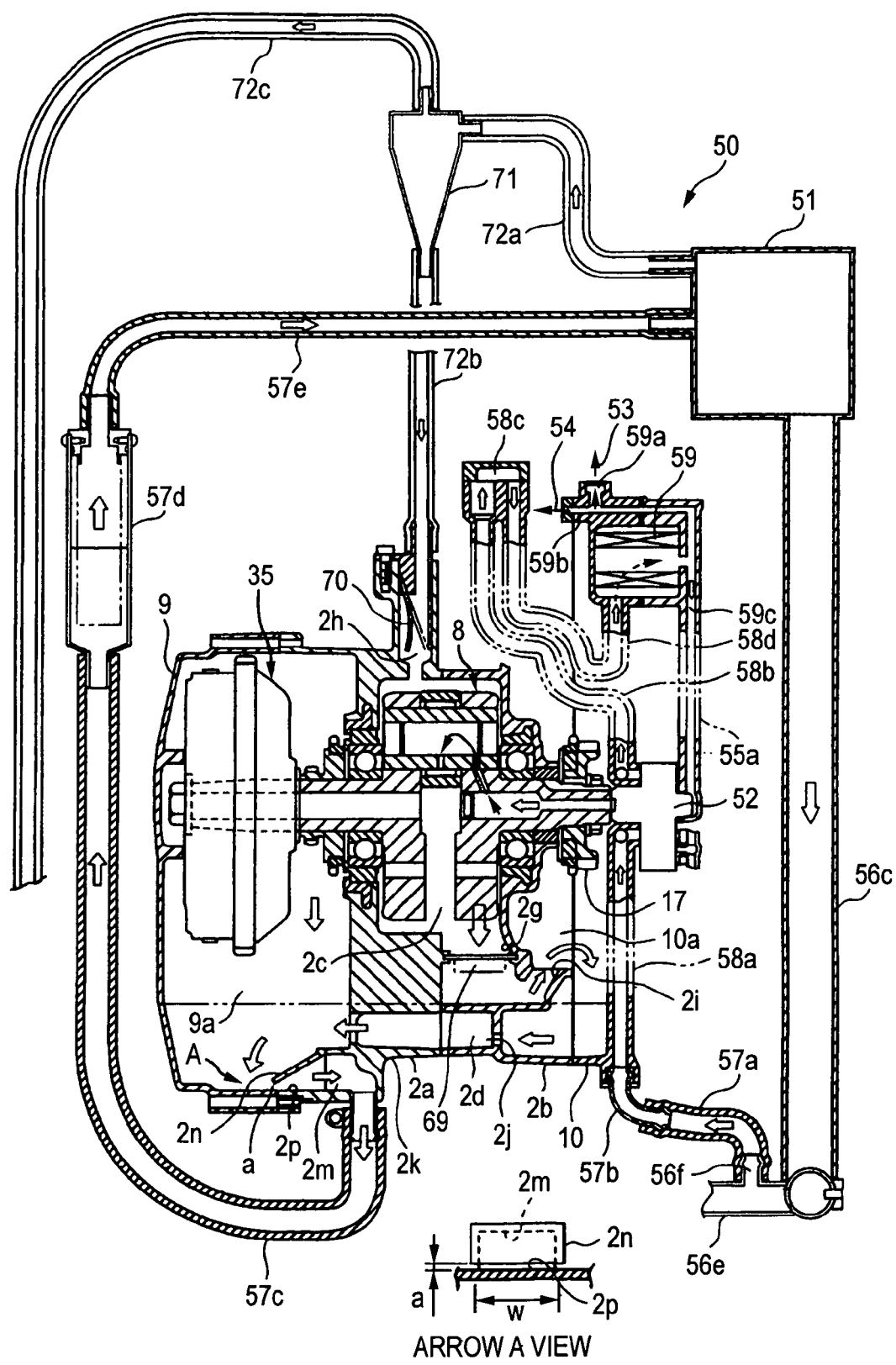
FIG. 18 is an explanatory drawing showing the construction of a lubrication system of the engine.

In addition, in the left-side bearing bracket 12, as shown in FIGS. 5, 17, the bolt connecting portions 12c, 12c extend from front and rear portions which hold the crankshaft 8 therebetween as seen in the direction in which the crankshaft 8 extends to the vicinity of the cylinder-side mating surface 2e of the crankcase 2. In addition, a collar hole 12e is formed in the boss portion 12b into which an iron bearing collar 12d having an outside diameter larger than that of a balancer driving gear 25a, which will be described later on, is press fitted. And, a left-side crankshaft bearing 11a is inserted to be fitted in the bearing hole 12a of the bearing collar 12d.

Here, the bearing collar 12d is provided to facilitate the assembly of the crankshaft 8 in the crankcase 2 with a gear unit 25 having the balancer driving gear 25a being press fitted on the crankshaft 8.

In addition, as shown in FIG. 5, a seal plate 25d is interposed between the gear unit 25 on a left shaft portion 8c of the crankshaft 8 and the bearing 11a. An inside diameter side portion of the seal plate 25d is held by the gear unit 25 and an inner race of the bearing 11a, and a slight gap is provided between an outside diameter side portion thereof and an outer race of the bearing 11a for avoiding the interference therebetween. In addition, an inner circumferential surface of a flange portion 12h of the bearing collar 12d is brought into sliding contact with an outer circumferential surface of the seal plate 25d.

Furthermore, a seal tube 17i is interposed between the bearing 11a' of a right shaft portion 8c' of the crankshaft 8 and a cover plate 17g. An inner circumferential surface of the seal tube 17i is fixedly fitted on the right shaft portion 8c'. In addition, a seal groove having a labyrinth construction is formed in an outer circumferential surface of the seal tube 17i, and the outer circumferential surface of the seal tube 17i is brought into sliding contact with an inner circumferential surface of a seal bore 2p formed in the right case portion 2b.

Thus, the leakage of pressure within a crank compartment 2c is prevented by interposing the seal plate 25d and the seal tube 17i on the outside of the bearings 11a, 11a' of the left- and right-side bearing portions 8c, 8c' of the crankshaft 8, respectively.

Thus, according to the embodiment, since the bolt connecting portions (connecting boss portion) 12c, 12c which extend toward the cylinder body 3 side are formed integrally on the both sides across a cylinder bore axis A of each of the crankshaft supporting bearing members 12, 12' of an iron alloy which are cast in the crankcase 2 of an aluminum alloy and the case bolt 30a for connecting the cylinder body 3 to the crankcase 2 is screwed into the bolt connecting portion 12c, the load due to the combustion pressure can uniformly borne by the two front and rear bolt connecting portions 12c which are disposed across the cylinder bore axis A, thereby making it possible to increase the connecting rigidity between the cylinder body 3 and the crankcase 2.

In addition, since the balance shafts 22, 22', which are disposed in the vicinity of the crankshaft 8 in parallel therewith, are supported by the iron alloy bearing members 12, 12' at at least one end portions thereof, the supporting rigidity of the balance shafts 22, 22' can be enhanced.

Furthermore, since the upper end faces 12f the bolt connecting portions 12c are positioned inwardly of each of the iron alloy bearing brackets 12, 12' so that the upper end faces 12f are not exposed to the cylinder-side mating surface 2e of the crankcase 2 in embedding the iron alloy bearing brackets 12, 12' in the interior of the crankcase 2, there is no case where metallic members which are different in hardness and material exist at the joint between the crankcase 2 and the cylinder block 3 in an mixed fashion, and hence the reduction in sealing capability can be avoided. Namely, in the event that the upper end face 12f of the iron alloy bolt connecting portion 12c is brought into abutment with the case-side mating surface 3c formed on the lower flange 3b of the aluminum alloy cylinder body 3, the sealing capability is lowered due to the difference in thermal expansion coefficient or the like.

In addition, since, in the left-side bearing bracket 12, the bearing collar 12d whose outside diameter is larger than balancer driving gear 25a is mounted on the outer circumferential surface of the bearing 11a, when assembling the crankshaft 8 in the crankcase 2 with the balancer driving gear 25a being mounted by way of press fit or the like to be fixed thereto (or, there is, of course, no problem even in the event that the gear 25a is formed as an integral part of the crankshaft 8), there is no risk that the balancer driving gear 25a interferes with a smallest inside diameter portion of the boss portion 12b of the bearing bracket 12, and hence the crankshaft 8 can be assembled properly without any problem.

The crankcase 2 is a two-piece type in which the crankcase 2 is divided into the left and right case portions 2a, 2b. A left case cover 9 is detachably attached to the left case portion 2a, and a space surrounded by the left case portion 2a and the left case cover 9 constitutes a flywheel magnet compartment 9a. A flywheel magnetic generator 35 attached to the left end portion of the crankshaft 8 is accommodated in this flywheel magnet compartment 9a. Note that the flywheel magnet compartment 9a communicates with a camshaft arranging compartment via chain compartments 3d, 4d, which will be described later on, whereby most of the lubricating oil which has been used to lubricate camshafts falls into the flywheel magnet compartment 9a via the chain compartments 3d, 4d.

In addition, a right case cover 10 is detachably attached to the right case portion 2b, and a space surrounded by the right case portion 2b and the right case cover 10 constitutes a clutch compartment 10a.

The crank compartment 2c and a transmission compartment 2d are formed at front and rear portions of the crankcase 2, respectively. The crank compartment 2c is made to open to the cylinder bore 3a but is defined substantially to be separated from the other compartments such as the transmission compartment 2d. Due to this, the pressure within the transmission compartment 2d is caused to fluctuate as the piston reciprocates vertically, thereby allowing the transmission compartment 2d to function as a pump.

The crankshaft 8 is arranged such that left and right arm portions 8a, 8a and left and right weight portions thereof are accommodated in the crank compartment 2c. The crankshaft 8 is an assembly including a left crankshaft portion into which the left arm portion 8a, weight portion 8b and shaft portion 8c are integrated and a right crankshaft portion into which the right arm portion 8a, weight portion 8b and shaft portion 8c' are integrated, the left crankshaft portion and the right crankshaft portion being connected integrally through a tubular crank pin 8d.

The left and right shaft portions 8c, 8c' are rotationally supported on the left and right case portions 2a, 2b via the crankshaft bearings 11a, 11a'. As has been described above, the bearings 11a, 11a' are press fitted in the bearing holes 12a in the iron alloy bearing brackets 12, 12' which are insert cast in the left and right case portions 2a, 2b of aluminum alloy.

A transmission 13 is accommodated and arranged in the transmission compartment 2d. The transmission 13 is such as to have a constant mesh construction in which a main shaft 14 and a drive shaft 15 are provided and arranged in parallel with the crankshaft 8, and first-speed to fifth-speed gears 1p to 5p attached to the main shaft 14 are made to constantly mesh with first-speed to fifth-speed gears 1w to 5w attached to the drive shaft 15.

The main shaft 14 is rotationally supported by the left and right case portions 2a, 2b via main shaft bearings 11b, 11b, whereas the drive shaft 15 is rotationally supported by the left and right case portions 2a, 2b via drive shaft bearings 11c, 11c.

A right end portion of the main shaft 14 passes through the right case portion 2b and protrudes to the right side, and a clutch mechanism 16 is attached to the protruding portion, and this clutch mechanism 16 is located within the clutch compartment 10a. Then, a large reduction gear (an input gear) 16a of the clutch mechanism 16 meshes with a small reduction gear 17 fixedly attached to the right end portion of the crankshaft 8.

A left end portion of the driveshaft 15 protrudes outwardly from the left case portion 2a and a driving sprocket 18 is attached to the protruding portion. This driving sprocket 18 is connected to a driven sprocket on a rear wheel.

A balancer unit 19 according to the embodiment includes front and rear balancers 20, 20' disposed opposite across the crankshaft 8 and having substantially the same construction. The front and rear balancers 20, 20' include the balance shaft 22, 22' which do not rotate and weights 24, 24 which are rotationally supported on the balance shat via bearings 23, 23.

Here, the balance shafts 22, 22' are made to double as the case bolts (the connecting bolts) for connecting the left and right case portions 2a, 2b together in the direction in which the crankshaft extends. The respective balance shafts 22, 22' is also used to connect the left and right case portions together by causing flange portions 22a formed on insides of the rotationally supported weights 24 in a transverse direction of the engine to abut with outer end faces of boss portions 12g integrally formed on the bearing brackets 12', 12 which are insert cast into the left and right case portions 2a, 2b and screwing fixing nuts 21a, 21b on opposite ends of the respective balance shafts.

The weight 24 includes a semi-circular weight main body 24a and a circular gear supporting portion 24b which is integrally formed on the weight main body, and a ring-shaped balancer driven gear 24c is fixedly attached to the gear supporting portion 24b. Note that reference numeral 24b denotes a hole made in a part of the weight 24 which is situated opposite to the weight main body 24a so as to reduce the weight of the part to as low a level as possible.

The balancer driven gear 24c attached to the rear balancer 20' meshes with the balancer driving gear 25a which is rotationally attached relative to the gear unit 25 which is securely attached to the left shaft portion 8c of the crankcase 8 through press fit.

Figure 11:
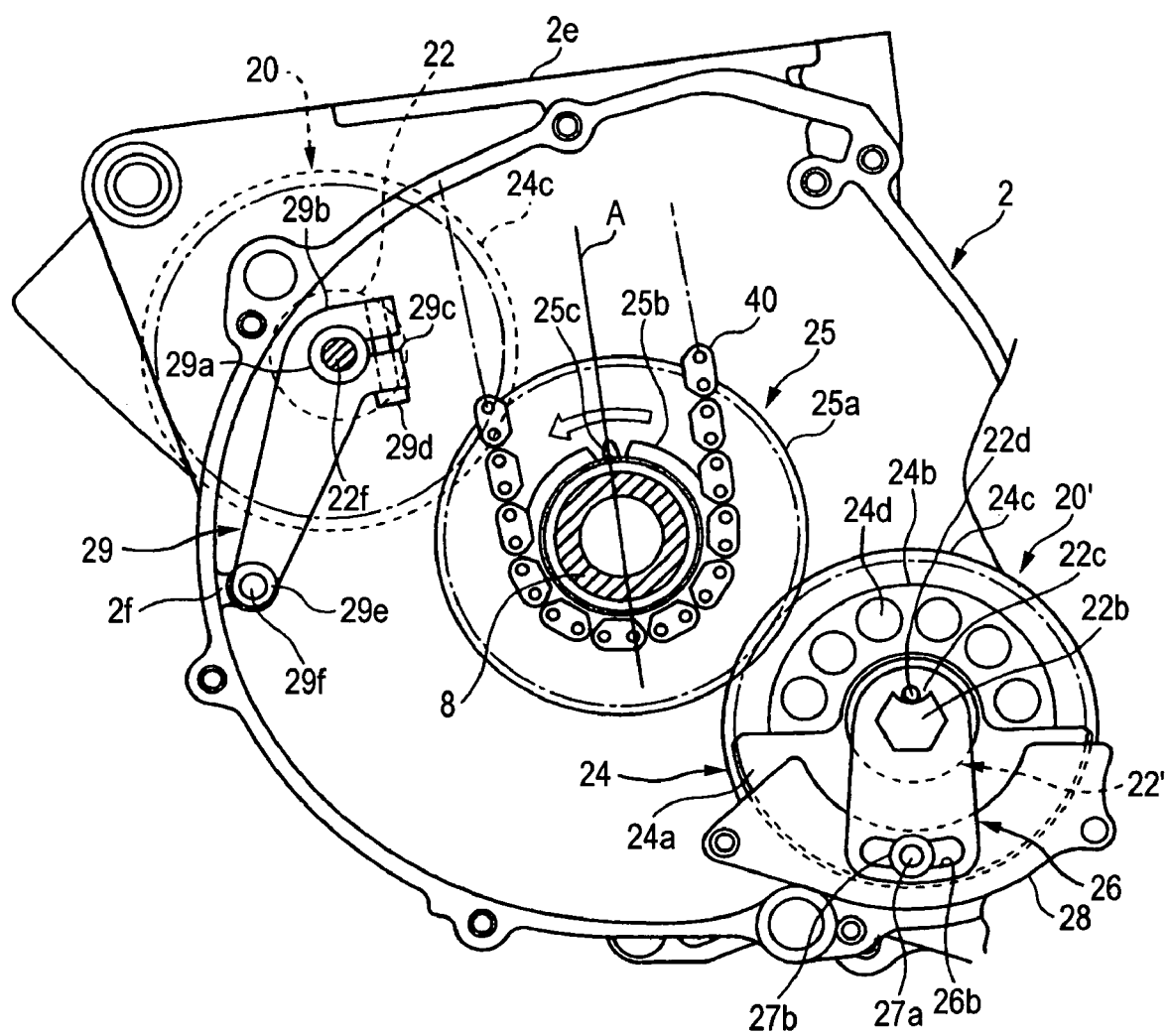
FIG. 11 is a left-hand side view showing a balancer unit of the engine.

Note that reference numeral 25b denotes a timing chain driving sprocket integrally formed on the gear unit 15 and has, as shown in FIG. 11, an aligning or timing mark 25c for alignment of timing marks for valve timing. The gear unit 25 is press fitted on the crankshaft 8 such that the timing mark 25c aligns with the cylinder bore axis A as viewed in the direction in which the crankshaft extends when the crankshaft 8 is situated at a top dead center of a compression stroke.

In addition, the balancer driven gear 24c attached to the front balancer 20 meshes with a balancer driving gear 17a which is supported rotationally relative to the small reduction gear 17 which is fixedly attached to the right shaft portion 8c' of the crankshaft 8.

Here, the rear balancer driving gear 25a is supported rotationally relative to the gear unit 25, and the front balancer driving gear 17a is supported rotationally relative to the small reduction gear 17. Then, U-shaped damper springs 33 each made up of a plate spring are interposed between the balancer driving gears 25a, 17a and the gear unit 25 and the small reduction gear 17, respectively, to thereby restrain the transmission of impact generated due to a torque fluctuation occurring in the engine to the balancers 20, 20' is restrained from being transmitted.

Figure 14:
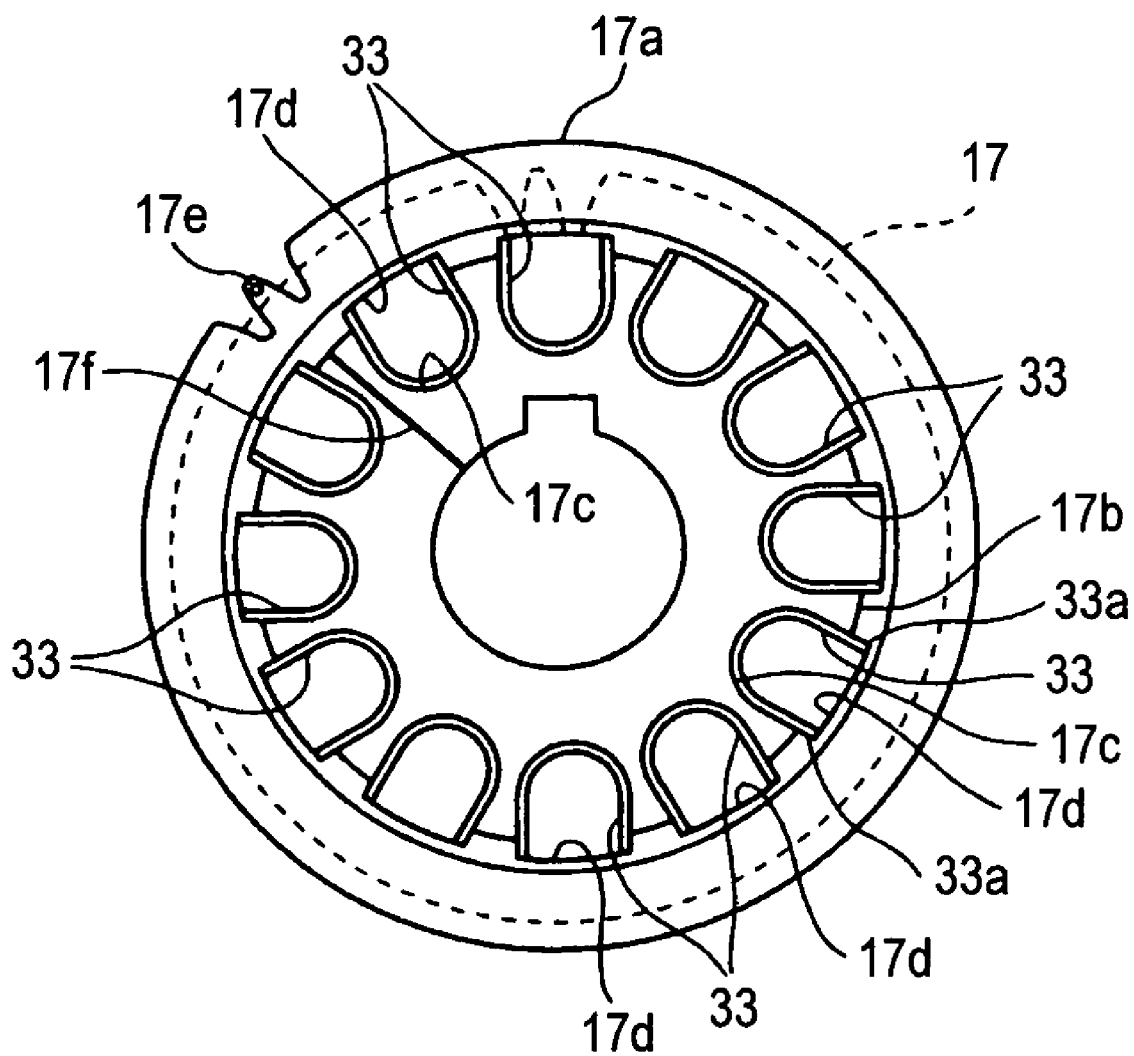
FIG. 14 is a side view showing a damping construction of a balancer drive gear of the balancer unit.
Figure 15:
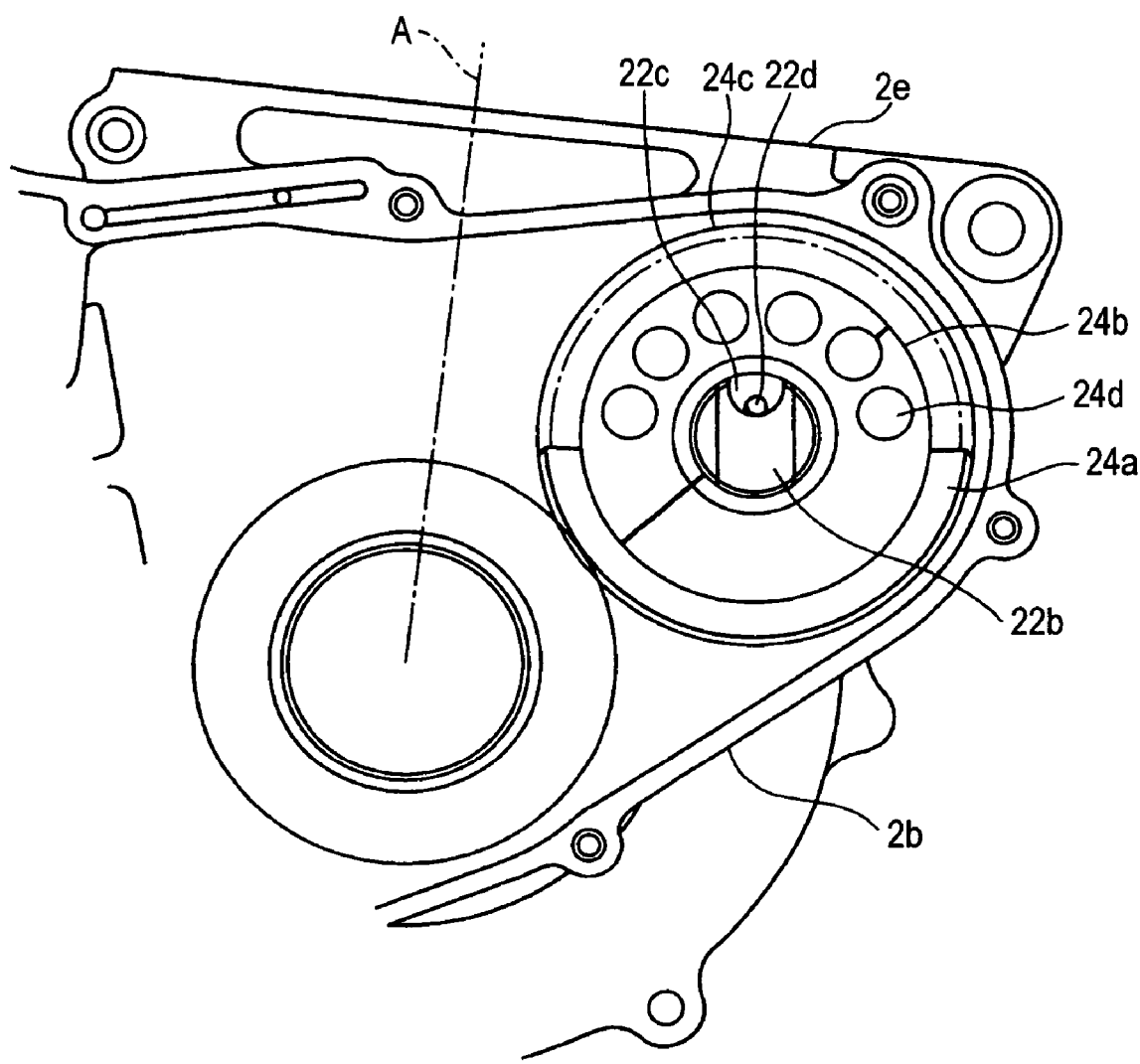
FIG. 15 is a right-hand side view of the balancer unit.

Here, while the balancer driving gear 17a for driving the front balancer 20 will be described in detail by reference to FIG. 14, the same description would be given if the balancer driving gear 25a for driving the rear balancer were described. The balancer driving gear 17a is formed into a ring shape and is supported by a sliding surface 17b formed so as to have a smaller diameter than the small reduction gear 17 rotationally relative to a side of the small reduction gear 17. Then, a number of U-shaped spring retaining grooves 17c are formed in the sliding surface 17b by setting them back into the surface thereof in a radial fashion about the center of the crankshaft, and the U-shaped damper springs 33 are arranged to be inserted in place within the spring retaining grooves 17c. Opening side end portions 33a, 33a of the damper spring 33 are locked at front and rear stepped portions formed in a locking recessed portion 17d formed in an inner circumferential surface of the balancer driving gear 17a.

When a relative rotation is generated between the small reduction gear 17 and the balancer driving gear 17a due to a torque fluctuation, the damper springs 33 resiliently deform in a direction in which the space between the end portions 33a, 33a narrows so as to absorb the torque fluctuation so generated. Note that reference numeral 17g denotes a cover plate for retaining the damper springs 33 within the retaining grooves 17c, reference numeral 17h denotes a key for connecting the small reduction gear 1 with the crankshaft 8, and reference numerals 17e, 17f denote, respectively, alignment marks for use in assembling the small reduction gear 17 and the balancer driving gear 17a.

A mechanism for adjusting a backlash between the balancer driven gears 24c, 24c and the balancer driving gears 25a, 17a is provided on the balancers 20, 20'. This adjusting mechanism is constructed such that the balancer axis of the balance shaft 22, 22' slightly deviates from the rotational center of the balancer driven gear 24c. Namely, when the balance shaft 22, 22' is made to rotate about the balancer axis, the space between the rotational center line of the balancer driven gear 24c and the rotational center line of the balancer driving gear 25a, 17a changes slightly, whereby the backlash is changed.

Here, a mechanism for rotating the balance shaft 22, 22' differs between the front balancer 20 and the rear balancer 20'. Firstly, in the rear balancer 20', a hexagonal locking protruding portion 22b is formed on a left end portion of the rear balance shaft 22', and a spline-like (a polygonal star-like) locking hole 26a formed in one end of a rotational lever 26 is locked on the locking protruding portion 22b. In addition, an arc-like bolt hole 26b is formed in the other end portion of the rotational lever 26 in such a manner as to extend about the balancer axis.

A fixing bolt 27 passed through the bolt hole 26b is planted in a guide plate 28. The guide plate 28 is generally formed into an arc-like shape and is fixedly bolted to the crankcase 2. Note that the guide plate 28 has also a function to control the flow of lubricating oil.

The adjustment of the backlash of the rear balancer 20' is implemented by rotating the rotational lever 26 so as to bring the backlash to an appropriate state with the fixing nut 21a being loosened and thereafter by fixing the rotational lever 26 with the fixing bolt 27a and a fixing nut 27b, and thereafter, the fixing nut 21a is refastened.

Figure 12:
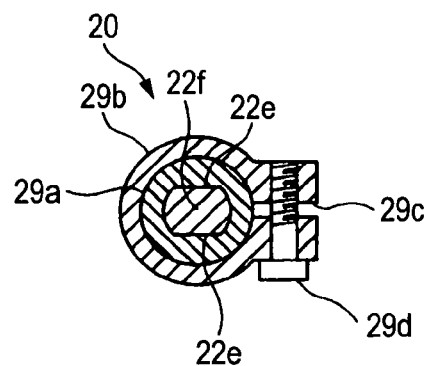
FIG. 12 is an enlarged cross-sectional view of a portion where a holding lever of the balancer unit is attached.
Figure 13:
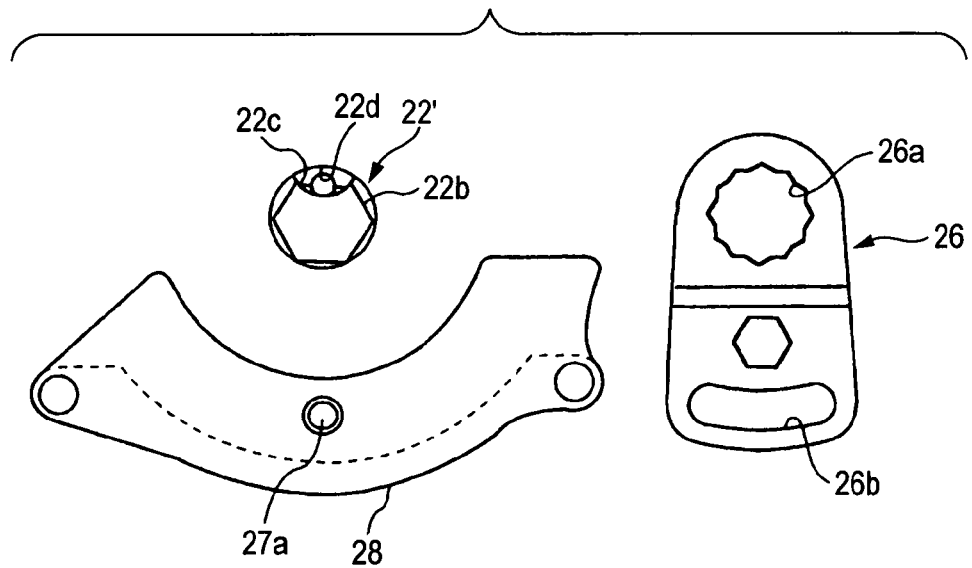
FIG. 13 is a side view of constituent components of a rotational lever of the balancer unit.

A grip portion 22f having an oval cross section, which is formed by forming a flat portion 22e on both sides of a cross-sectionally circular shape, is formed on a left end portion of the front balance shaft 22 (refer to FIG. 12). A collar 29a having an inner circumferential shape which matches an outer circumferential shape of the grip portion 22f is attached to the grip portion 22f, and furthermore, a holding portion 29b of a holding lever 29 is attached to an outside of the collar 29a in such a manner as to move axially but as not to rotate relatively. A distal end portion 29e of the holding lever 29 is fixed to a boss portion 2f of the left case portion 2a with a bolt 29f. In addition, a tightening slit 29c is formed in the holding portion 29b of the holding lever 29, so that the rotation of the collar 29 and hence of the balance shaft 22 is prevented by tightening up the fixing bolt 29d. Furthermore, the fixing nut 21b is screwed on the balance shaft 22 to an outer side of the collar 29 so as to be secured thereto via washer.

The adjustment of the backlash of the front balancer 20 is implemented by loosening the fixing nut 21b or preferably removing the same, griping the grip portion 22f of the balance shaft 22 with a tool to rotate the shaft so as to bring the backlash to an appropriate state, and thereafter tightening up the fixing bolt 29d, and thereafter, the fixing nut 21b is fastened.

In addition, a lubricating oil introducing portion 22c is formed in an upper portion of the locking protruding portion 22b by cutting out the upper in an arc. A guide bore 22d is made to open to the introducing portion 22c, and the guide bore extends into the balance shaft 22 and passes therethrough to below an outer circumferential surface of the balance shaft 22, whereby the lubricating oil introducing portion 22c is made to communicate with an inner circumferential surface of the balancer bearing 23. Thus, lubricating oil that has fallen in the lubricating oil introducing portion 22c is supplied to the balancer bearing 23.

Here, while the weight 24 and the balancer driven gear 24c are disposed at the right end portion along the direction in which the crankshaft extends in the front balancer 20, in the rear balancer 20', they are disposed at the left end portion. In addition, the balancer driven gear 24c is located rightward relative to the weight 24 in both the front and rear balancers 20, 20', and therefore, the weight 24 and the balancer driven gear 24c are set into the same configuration in both the front and rear balancers.

Thus, according to the embodiment, since the weight main body 24a and the balancer driven gear 24c of the balancer 20 are disposed on the right-hand side (one side) of the front balance shaft (the primary balance shaft) 22 along the direction in which the crankshaft extends and the weight main body 24a and the balancer driven gear 24c are disposed on the left-hand side (the other side) of the rear balance shaft (the secondary balance shaft) 22' along the direction in which the crankshaft extends, the reduction in balance in weight in the crankshaft direction that would result when providing a two-shaft balancer unit can be avoided.

In addition, since the front and rear balance shafts 22, 22' are made to double as the case bolts for connecting the left and right case portions 2a, 2b together, when adopting a two-shaft balancer unit, the connecting rigidity of the crankcase can be enhanced while restraining the construction of the engine from becoming complex and the number of components from being increased.

Additionally, since the balancer weight main body 24a and the balancer driven gear 24c are made integral and are supported rotationally by the balance shafts 22, 22', respectively, only the weight made up of the balancer weight main body 24a and the balancer driven gear 24c may be driven to rotate, and therefore, the engine output can be attempted to be used effectively to such an extent that the balance shafts themselves do not need to be driven to rotate.

In addition, the degree of freedom in assembling can be improved when compared with an engine construction in which a balancer weight and a balance shaft are made integral.

Additionally, since the rotational center lines of the balancer driven gears 24c are caused to deviate relative to the axes of the balance shafts 22, 22', the backlash between the balancer driven gears 24c and the balancer driving gears 25a, 27a on the crankshaft 8 side can be adjusted by the simple construction or only by a simple operation of rotating the balance shafts, thereby making it possible to prevent the generation of noise.

On the front balance shaft 22, the backlash adjustment is implemented by gripping the grip portion 22f formed on the left-hand side of the balance shaft 22 with a tool so as to rotate the balance shaft 22, and on the rear balance shaft 22', the backlash adjustment is implemented by rotating the rotational lever 26 provided on the left-hand side of the balance shaft 22'. Thus, on either of the front and rear balance shafts 22, 22', the backlash can be adjusted from the left-hand side of the engine, and hence the backlash adjusting work can be implemented efficiently.

Additionally, since the balancer driving gear 17a on the crankshaft 8 side which meshes with the balancer driven gear 24c is constructed to be disposed in such a manner as to rotate relatively to the sliding surface 17b of the small reduction gear 17 which is fixed to the crankshaft 8 and the U-shaped damper springs 33 are disposed in the spring retaining grooves 17c formed by setting them back from the sliding surface 17b, the impact generated due to the torque fluctuation in the engine can be absorbed by the compact construction so that the balancer unit can be operated smoothly. Note that the same description can be made with respect to the balancer drive gear 25a.

Furthermore, a coolant pump 48 is disposed at the right end portion of the front balance shaft 22 coaxially therewith. A rotating shaft of the coolant pump 48 is connected to the balance shaft 22 by an Oldham's coupling which has a similar construction to that of a lubricating oil pump 52, which will be described later on, in such a manner that a slight deviation between the centers of the rotating shaft and the balance shaft 22 can be absorbed.

In a valve train device of the embodiment, an intake camshaft 36 and an exhaust camshaft 37 which are disposed within the cylinder head cover 5 are constructed to be driven to rotate by the crankshaft 8. To be specific, a crankshaft sprocket 25b of the gear unit 25 press fitted on the left shaft portion 8c of the crankshaft 8 so as to be attached thereto and an intermediate sprocket 38a rotationally supported by a support shaft 39 planted in the cylinder head 4 are connected by a timing chain 40, and an intermediate gear 38 formed integrally on the intermediate sprocket 38a and having a smaller diameter than that of the intermediate sprocket 38a meshes with intake and exhaust gears 41, 42 secured to end portions of the intake and the exhaust camshafts 36, 37. Note that the timing chain 40 is disposed so as to pass through the chain compartments 3d, 4d formed on the left walls of the cylinder block 3 and the cylinder head 4.

The intermediate sprocket 38a and the intermediate gear 38b are rotationally supported by the support shaft 39 which passes through the chain compartment 4d on the cylinder head 4 in the direction in which the crankshaft extend along the cylinder bore axis A via two sets of needle bearings 44. The support shaft 39 is fixed at a flange portion 39a thereof to the cylinder head 4 with two bolts 39b. Note that reference numerals 39c, 39d denote a sealing gasket, respectively.

Here, commercially available (standard) bearings are adopted for the two sets of needle bearings 44, 44. A space adjusting collar 44a is disposed between the respective bearings 44, 44, and thrust washers 44b, 44b for receiving thrust load are provided at ends of the bearings. The thrust washer 44b is formed into a stepped shape having a large diameter portion which is brought into sliding contact with an end face of the intermediate sprocket and a stepped portion which protrudes axially toward the needle bearing 44.

Thus, since the space adjusting collar 44a is interposed between the two sets of bearings 44, 44, commercially available standard bearings can be adopted for the needle bearings by adjusting the length of the collar 44a, thereby making it possible to reduce costs.

In addition, since the washer having the stepped configuration is adopted as the thrust washer 44b, the assembling work of the intermediate sprocket 38a can be improved. Namely, in assembling the intermediate sprocket 38a, while the support shaft 39 is inserted from the outside in a state in which the intermediate sprocket 38a and the intermediate gear 38b are disposed within the chain compartment 4d with the thrust washers being positioned at the ends of the intermediate sprocket 38a and the intermediate gear 38b in such a manner as not to fall therefrom, the thrust washer 44b can be prevented from falling by allowing the stepped portion of the thrust washer 44b to be locked in a shaft hole in the intermediate sprocket 38a, and hence the assembling properties can be improved.

In addition, an oil hole 39e is formed in the support shaft 39 for supplying lubricating oil introduced from the cam compartment via an oil introducing bore 4e formed in the cylinder head 4 to the needle bearing 44.

Additionally, four weight reduction holes 38c and two inspection holes 38c' adapted to be used at the time of assembling and made to double as weight reduction holes are formed at intervals of 60 degrees. Then, an alignment or timing mark 38d is stamped on a tooth situated substantially at the center of the inspection hole 38c' for the intermediate gear 38b, and timing marks 41a, 42a are also stamped on two teeth of intake and exhaust camshaft gears 41, 42 which correspond to the timing marks 38d. Here, when aligning the left and right timing marks 38d, 38d with the timing marks 41a, 42a, the intake and exhaust camshafts gears 41, 42 are located at positions, respectively, which correspond to a top dead center of a compression stroke.

Furthermore, timing marks 38e, 38e are also formed at portions of the intermediate sprocket 38a which are situated on a cover side mating surface 4f of the cylinder head 4 when the timing marks 38d align with 41a, 42a.

To align valve timings, firstly, the crankshaft 8 is held at a top dead center of a compression stroke by aligning the timing mark 25c (refer to FIG. 11) with the cylinder bore axis A. In addition, the intermediate sprocket 38a and the intermediate ear 38b which are attached to the cylinder head 4 via the support shaft 39 are positioned so that the timing mark 38e of the intermediate sprocket 38a aligns with the cover side mating surface 4f, and in this state, the crankshaft sprocket 25b and the intermediate sprocket 38a are connected by the timing chain 40. Then, the intake and exhaust camshaft gears 41, 42 on the intake and exhaust camshafts 36, 37 are brought into mesh engagement with the intermediate gear 38b while confirming through the inspection hole 38c' that the timing marks 41a, 42a align with the timing mark 38d on the intermediate gear 38b, and the intake and exhaust camshafts 36, 37 are fixed to an upper surface of the cylinder head 4 via cam carriers.

Thus, since the inspection holes 38c' made to double as the weight reduction holes to reduce the weight of the large diameter intermediate sprocket 38a are provided in the intermediate sprocket 38a, so that the alignment of the timing marks 38d on the small diameter intermediate gear 38b which is set on the back of the intermediate sprocket 38a with the timing marks 41a, 42a on the camshaft gears 41, 42 can be confirmed through the inspection holes 38c', the meshing positions of the intermediate gear 38b with the camshaft gears 41, 42 can visually confirmed in an easy and ensured fashion while the small diameter intermediate gear 38b is placed on the back of the large diameter intermediate sprocket 38a, thereby making it possible to align the valve timings without any problem.

In addition, since the intermediate gear 38b can be disposed on the back side of the intermediate sprocket 38a, the dimension from the camshaft gears 41, 42 which mesh with the intermediate gear 38b to a cam nose 36a can be made shorter, whereby the torsional angle of the camshaft can be made smaller to such an extent that the dimension is made so shorter, thereby making it possible to make compact an area surrounding the camshafts.

Namely, for example, in a case where the intermediate gear 38b is disposed on a front side of the intermediate sprocket 38a, while the valve timings can easily be aligned, the dimension from the camshaft gears 41, 42 to the cam nose becomes long, and the torsional angle of the camshafts becomes large to such an extent that the dimension is extended, thereby reducing the control accuracy of valve opening and closing timings.

In addition, in a case where the intermediate gear 38b is disposed in front of the intermediate sprocket 38a, a space between the intermediate sprocket support shaft 39 and the camshafts 36, 37 needs to be expanded in order to avoid any interference between the intermediate sprocket 38a and the camshaft 36, 37, this causing a concern that the area surrounding the camshafts is enlarged.

Here, a backlash adjusting mechanism is provided between the intermediate gear 38b and the camshaft gears 41, 42. This adjusting mechanism has a construction in which the intake camshaft gear 41 and the exhaust camshaft gear 42 are made up of two gears such as a driving gear (a power transmission gear) 46 and a shift gear (an adjusting gear) 45 and the angular positions of the driving gear 46 and the shift gear 45 can be adjusted.

Namely, the shift gear 45 and the driving gear 46 are fixed to flange portions 36b, 37b formed at end portions of the camshafts 36, 37, respectively, in such a manner that the angular positions thereof can be adjusted by four circumferentially long elongated holes 45a, 46a and four long bolts 68a. A clearance portion 46b is cut and formed in the driving gear 46 that is disposed outwardly, and only the shift gear 45 is fixed in such a manner that the angular position thereof can be adjusted two elongated holes 45b and two short bolts 68b by making use of the clearance portion 46.

Figure 3:
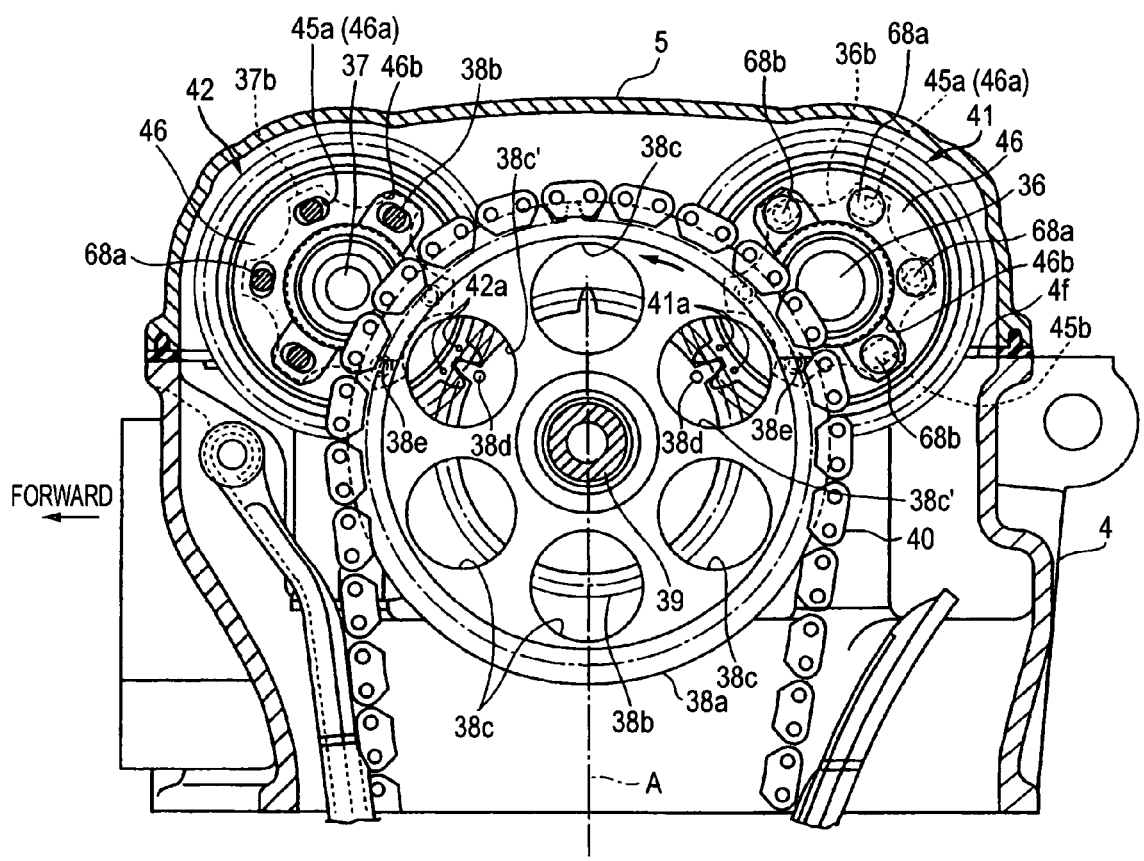
FIG. 3 is a left-hand side view showing a valve train device of the engine.
Figure 4:
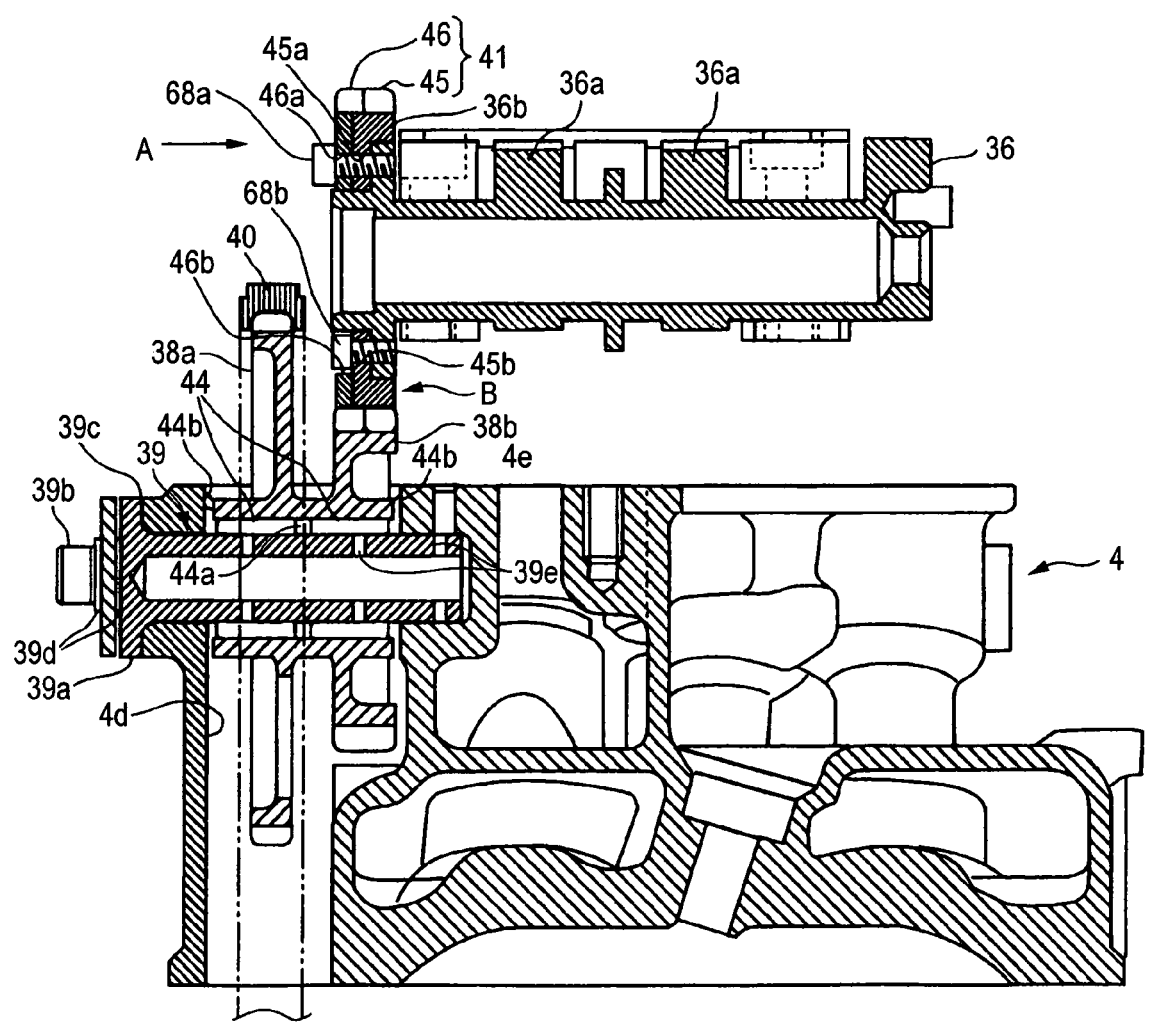
FIG. 4 is a sectional rear elevation of the valve train device.

A backlash adjustment is implemented according to the following procedure. Note that in the engine according to the embodiment, the intermediate gear 38b rotates counterclockwise as shown in FIG. 3 when viewed from the left-hand side of the engine. Consequently, both the intake camshaft gear 41 and the exhaust camshaft gear 42 rotate clockwise. In addition, here, while the backlash adjustment will be described with respect to the intake camshaft gear 41, the same description would be made with respect to the exhaust camshaft gear 42.

Firstly, all the fixing bolts 68a, 68b of the intake camshaft gear 41 are loosened, and the shift gear 45 is rotated clockwise so that front side surfaces of teeth of the shift gear 45 in the clockwise direction slightly abut with rear side surfaces of teeth of the intermediate gear 38b in the counterclockwise direction. In this state, the shift gear 45 is fixed to the flange portion 36b of the camshaft 36 with two short bolts 68b. Then, the driving gear 46 is rotated counterclockwise in such a manner that front side surfaces (driven surfaces) of teeth of the driving gear 46 in the counterclockwise direction abut with front side surfaces (driving surfaces) of the intermediate gear 38b in the counterclockwise direction so as to obtain a required backlash, and in this state, four long bolts 68a are tightened up, whereby the driving gear 46 and the shift gear 45 are fixed to the intake camshaft 36.

Thus, since the intake and exhaust camshaft gears 41, 42 are made up of the driving gear (power transmission gear) 46 and the shift (adjusting gear) 45 adapted to rotate relatively to the driving gear, respectively, the backlash can be adjusted by rotating the shift gear 45 relatively to the driving gear 46 forward or backward in the rotating directions.

Note that while, in this embodiment, both the driving gear 46 and the shift gear 45 which constitute the camshaft gears 41, 42 are described as being able to rotate relatively to the camshafts, one of the driving gear 46 and the shift gear 45 may be adapted to rotate relatively and the other gear may be integrated into the camshaft. In this case, it is desirable that the gear integrated into the camshaft constitutes the power transmission gear. Even if constructed in this way, similar function and advantage to those obtained by the embodiment can be obtained.

In addition, while in the embodiment, the invention is described as being applied to the construction in which the chain drive method is adopted, the invention can of course be applied to a drive method using a toothed belt.

Next, a lubricating construction will be described.

A lubrication system 50 of the engine according to the embodiment is constructed such that lubricating oil stored within a separate lubricating oil tank 51 is picked up and pressurized by a lubricating oil pump 52 via a down tube 56c on a vehicle body frame, lubricating oil discharged from the pump 52 is divided into three systems such as a cam lubricating system 53, a transmission lubricating system 54 and a crank lubricating system 55 so as to be supplied to parts needing to be lubricated at the respective systems, and lubricating oil used for lubricating the respective parts needing lubrication is returned to the lubricating oil tank 51 by making use of pressure fluctuation occurring within the crank compartment 2c as the piston 6 reciprocates vertically.

The lubricating oil tank 51 is formed integrally within a space surrounded by a head pipe 56a, a main tube 56b, the down tube 56c and a reinforcement bracket 56d of the vehicle body frame 56. This lubricating oil tank 51 communicates with a cross pipe 56e which connects lower portions of the down tube 56c via the down tube 56c.

Then, the cross pipe 56e is connected to a pick-up port of the lubricating oil pump 52 via an outlet tube 56f connected thereto, an oil hose 57a, a joint pipe 57 band a pick-up passageway 58a formed in a crankcase cover. A discharge port of the lubricating oil pump 52 is connected to an oil filter 59 via an oil discharge passageway 58b, an external portion connecting compartment 58c and an oil passageway 58d, and is divided into three lubrication systems 53, 54, 55 on a secondary side of the oil filter 59.

The oil filter 59 is constructed such that an oil element 59e is disposed in a filter compartment 59d defined by detachably attaching a filter cover 47 to a filter recessed portion 10b provided in the right case cover 10 by setting part thereof further back from the rest.

The cam lubricating system 53 has a construction which is generally constructed such that a lower end of a vertical member 53a of a T-shaped lubricating oil pipe is connected to a cam side outlet 59a of an oil passageway formed to extend from the filter cover portion 47a to the outside of the filter recessed portion 10b, where as left and right ends of a horizontal member 53b of the lubricating oil pipe are connected to a camshaft oil supply passageway 53c, so that lubricating oil is supplied to parts such as bearings of camshafts 36, 37 which need to be lubricated via the passageway 53c.

The transmission lubricating system 54 has the following construction. A right transmission oil supply passageway 54a formed in the right case portion 2b is connected to a transmission side outlet 59b of the oil filter 59, and the right transmission oil supply passageway 54a communicates with the interior of a main shaft bore (an in-main shaft lubricating oil passageway) 14a formed along the axial center of the main shaft 14 via a left transmission oil passageway 54b formed in the left case portion 2a. Then, this main shaft bore 14a communicates with sliding surfaces of the main shaft 14 and change-gears via a plurality of branch holes (lubricating oil supply holes) 14b, whereby lubricating oil supplied to the main shaft bore 14a is supplied to the sliding surfaces through the branch holes 14b.

In addition, a portion of the left transmission oil supply passageway 54b situated along the length thereof communicates with a bolt bore 60a into which a case bolt 60 for connecting the left and right case portions 2a, 2b together is inserted. This bolt bore 60a is constructed such that a bore having an inside diameter which is slightly larger than the outside diameter of the case bolt 60 is formed in tubular boss portions 60c, 60c which are formed in such a manner as to extend inwardly from left and right sidewalls of the left and right case portions 2a, 2b, respectively, so as to abut with each other face-to-face at mating surfaces of the left and right case portions 2a, 2b, and a gap between an inner circumferential surface of the bolt bore 60a and an outer circumferential surface of the case bolt constitutes a lubricating oil passageway.

The boss portions 60c are situated above intermediate portions of the main shaft 14 and the drive shaft 15 and in the vicinity of meshing portions of gear trains on the respective shafts. In addition, an appropriate number of branch holes (lubricating oil supply holes) 60b are formed in the boss portions 60c for injecting lubricating oil in the holt hole 60a toward the meshing portions or surfaces of teeth of the respective gears.

Figure 19:
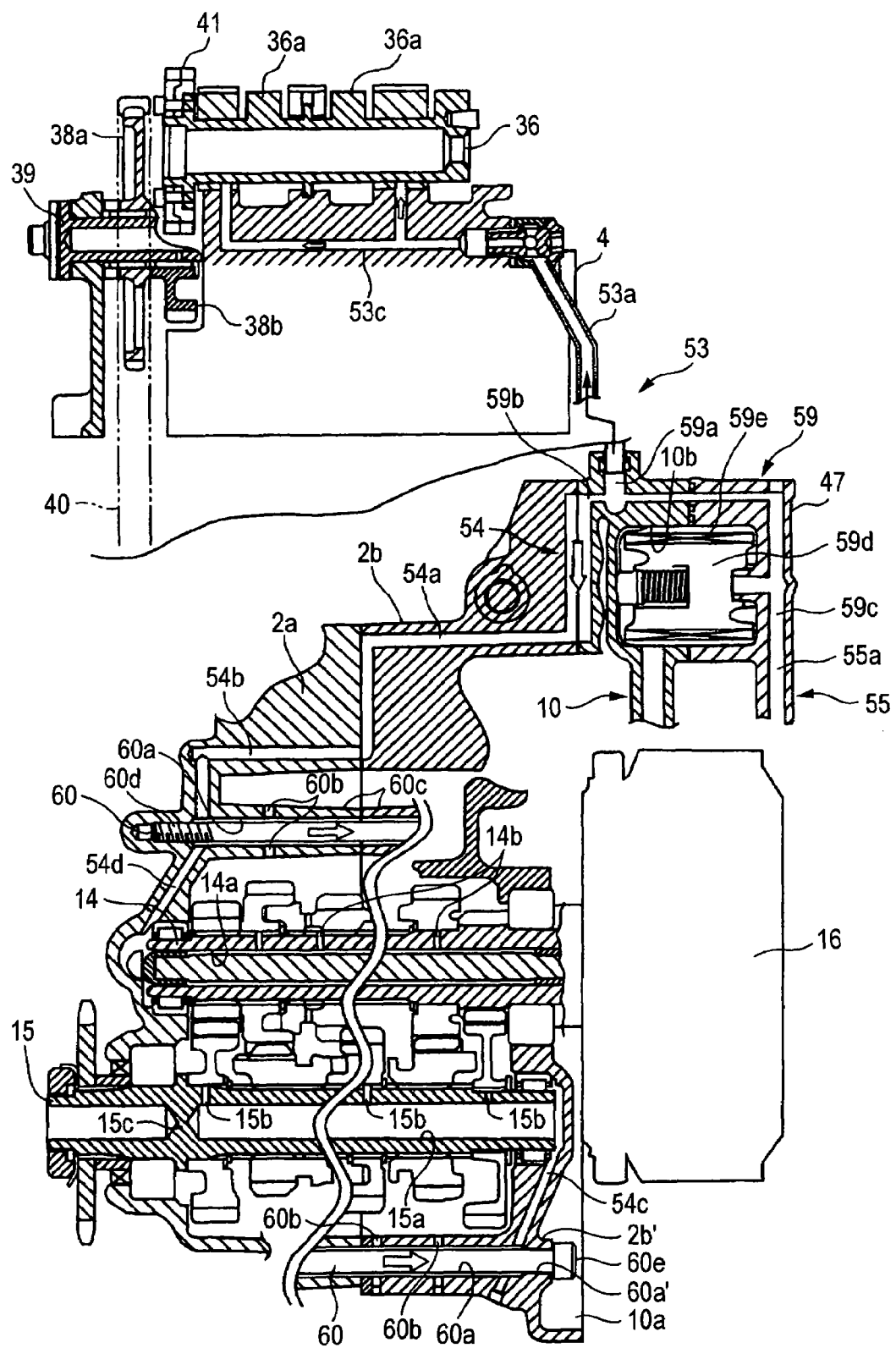
FIG. 19 is a drawing showing the construction of the lubrication system.
Figure 20:
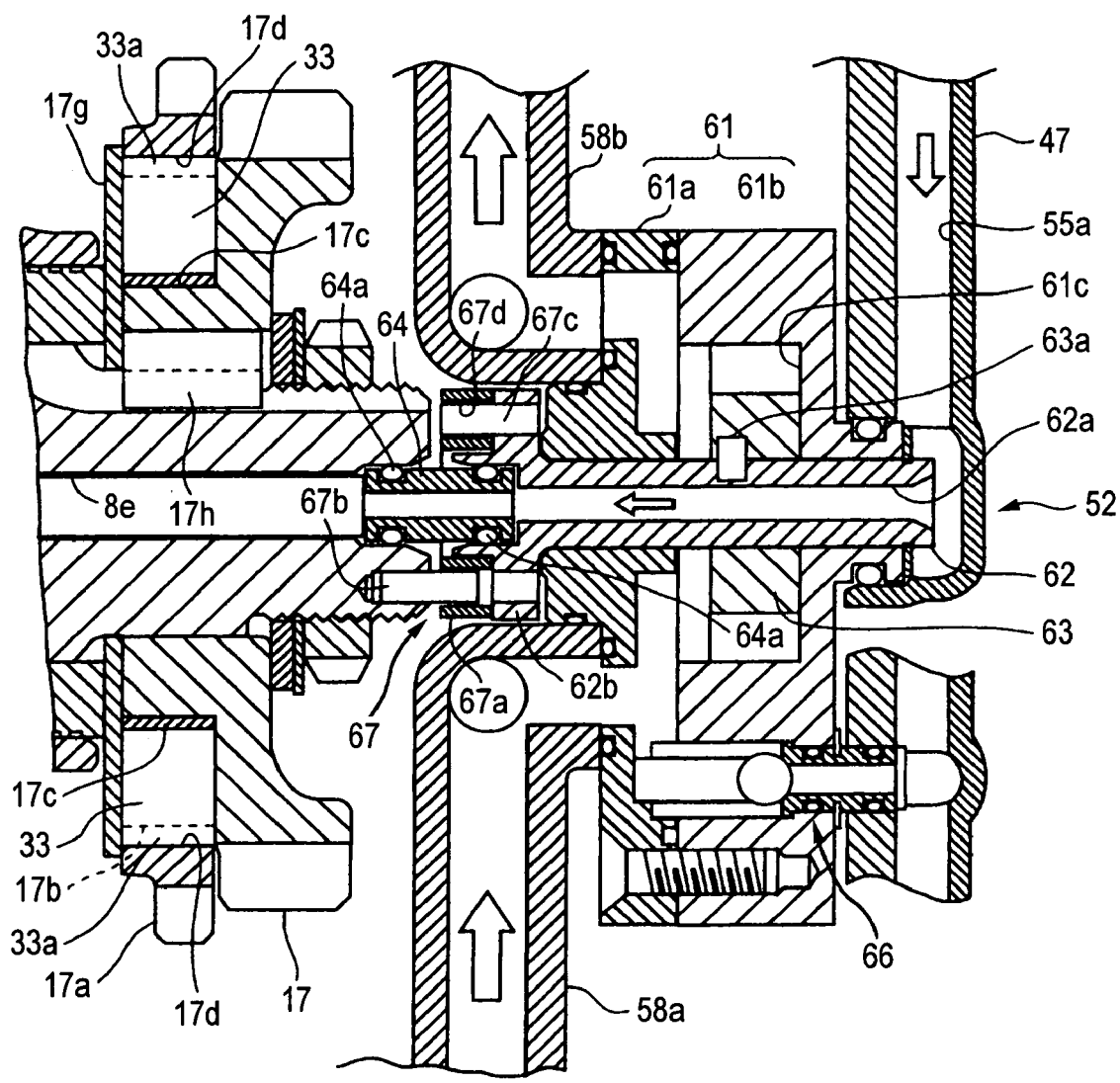
FIG. 20 is a sectional side view of an area surrounding a lubricating oil pump of the lubrication system.
Figure 21:
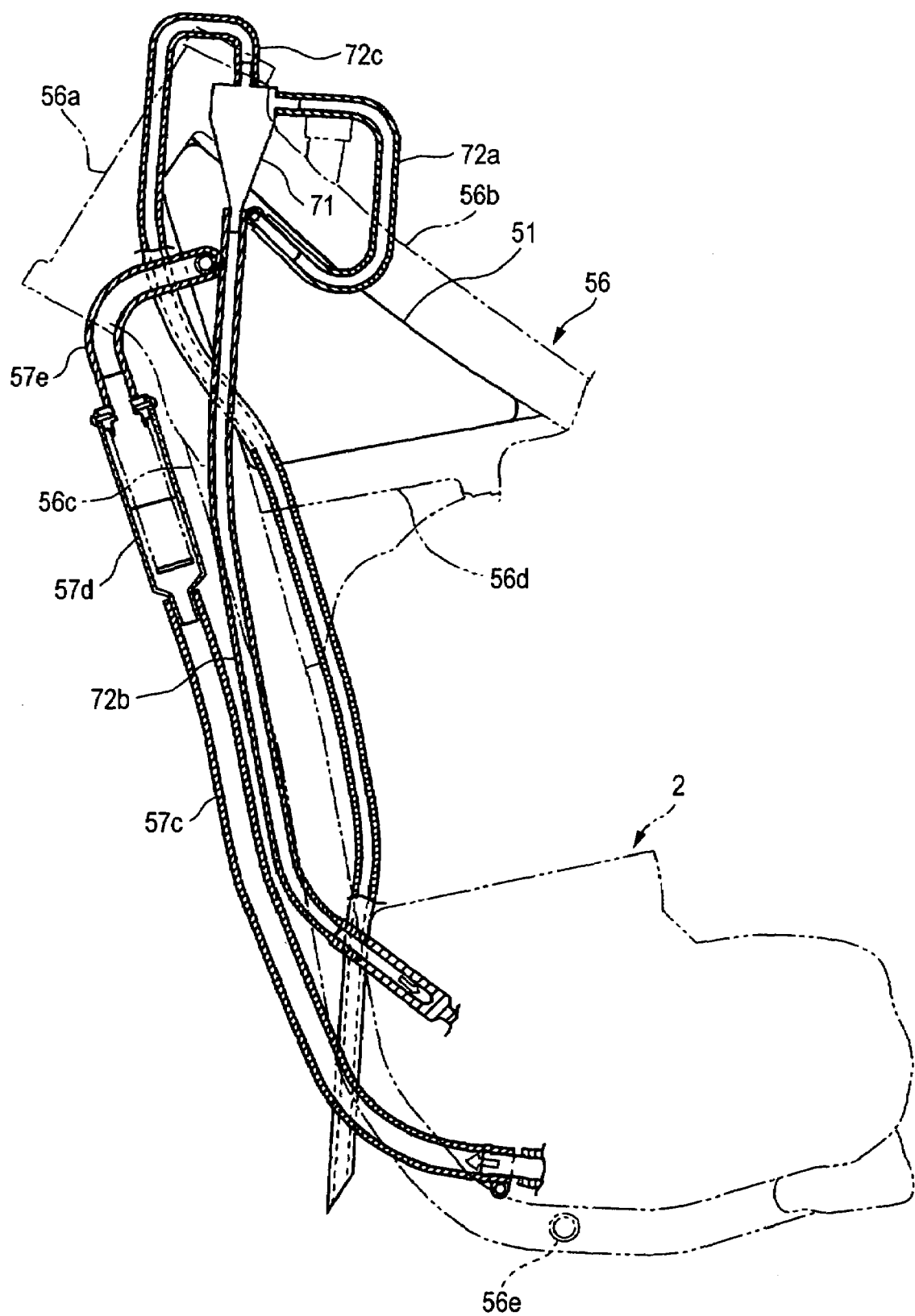
FIG. 21 is a sectional left-hand side view of the lubrication system.

Here, while, in FIG. 19, the case bolts 60 are illustrated as being deployed into both the left case portion (an upper portion in the drawing) and the right case portion (a lower portion in the drawing), these bolts constitute the same bolt. The case bolt 60 is inserted and screwed into the case portions from the clutch compartment 10a side in such a manner that a distal threaded portion 60d thereof is not exposed to the outside from a wall portion of the left case portion 2a. In addition, a proximal head portion 60e of the case bolt 60 is situated within the clutch compartment 10a and abuts with a seat surface 2b' formed on a side wall of the right case portion 2b which constitutes a bulkhead of the clutch compartment 10a.

Furthermore, the inside diameter of a portion of the bolt bore 60a which is immediately close to the head portion 60e is set smaller than that of the other portion of the bolt bore 60a which corresponds to the lubricating oil passageway so that a gap between the portion and the case bolt 60 is reduced. In addition, a right end portion of the bolt bore 60a communicates with a drive shaft bore (an in-drive shaft lubricating oil passageway) formed along the axial center of the drive shaft 15 via a communication hole 54c formed in a side wall of the right case portion 2b. Then, this drive shaft bore 15a communicates with sliding surfaces of the drive shaft 15 and the drive gears via a plurality of branch holes (lubricating oil supply holes) 15b. Thus, lubricating oil supplied to the drive shaft bore 15a is supplied to the sliding portions of the respective gears through the branch holes 15b.

Thus, as has been described heretofore, since the tubular boss portions 60c are formed in the vicinity of the main shaft 14 and the drive shaft 15 which constitute the transmission, and the case bolt 60 for connecting the crankcase together is inserted into the bolt bore 60a extending through the boss portions 60c so that the space between the inner circumferential surface of the bolt bore 60a and the outer circumferential surface of the case bolt 60 is made to constitute the lubricating oil passageway, and the branch holes (the lubricating oil supply holes) 60b directed to the change-speed gears are formed in the boss portions 60c, lubricating oil can be supplied to the meshing surfaces of the change-speed gears without providing exclusive lubricating oil supply passageways.

In addition, since the left and right boss portions 60c are extended in a tubular fashion so as to abut with each other face-to-face, and the left and right case portions 2a, 2b are connected together with the connecting bolt 60 that is inserted into the boss portions 60c, there is caused no risk that the sidewalls of the left and right case portions 2a, 2b are deformed by virtue of a connecting force so applied, and as a result, the connecting force of the laterally separable crankcase can be enhanced. In addition, since the connecting bolt 60 and the boss portions 60c are disposed at the position close to the main shaft 14 and the drive shaft 15, the portions close to the shafts are connected together, whereby the connecting force of the left and right case portions 2a, 2b can be enhanced from this point of view.

Additionally, since the connecting bolt 60 and the tubular boss portions 60c are disposed above the intermediate portions of the main shaft 14 and the drive shaft 15, and the lubricating oil supply bores 14b, 15b are formed so as to be directed toward the groups of change-speed gears on the main shaft and the drive shaft, the lubricating oil can be supplied to the gears of both the main shaft and the drive shaft via the single lubricating oil passageway 60a. In addition, since the connecting bolt 60 is disposed between the gears of the main shaft 14 and the drive shaft 15, the connecting bolt 60 can be made to be situated close to the both shafts, whereby the crankcase can be made smaller in size.

In addition, since the head portion 60e of the connecting bolt 60 is made to be located within the clutch compartment 10a, even in the event that lubricating oil leaks from a gap between the head portion 60e of the connecting bolt 60 and the seat surface 2b', there is no risk that the lubricating oil that has so leaked falls within the clutch compartment 10a.

Furthermore, since the lubricating supply port is formed on the screwed portion 60d side of the connecting bolt 60 which is not exposed to the outside portion, whereas the discharge port is formed on the head portion 60e side, there is naturally caused no risk of lubricating oil leakage from the lubricating oil supply port side portion of the lubricating oil passageway which provides a higher lubricating oil pressure. Moreover, since the lubricating oil pressure is lower on the discharge port side of the lubricating oil passageway which provides a higher risk that lubricating oil leaks from between the head portion 60e of the connecting bolt 60 and the seat surface 2b', the amount of lubricating oil that so leaks can be suppressed.

In addition, since the portion of the bolt bore 60a which is immediately close to the head portion 60e is set smaller in diameter than that of the other portion of the bolt bore 60a which corresponds to the lubricating oil passageway so that a gap between the portion and the case bolt 60 is reduced, the seat surface 2b' with which the head portion 60e of the connecting bolt 60 is allowed to abut can be secured with ease and the amount of lubricating oil that so leaks can be suppressed.

Additionally, since the lubricating oil discharge port of the lubricating oil passageway 60a is made to communicate with the in-drive shaft lubricating oil passageway 15 and the lubricating oil supply port thereof is made to communicate with the in-main shaft lubricating oil passageway 14a, lubricating oil can be supplied to the surfaces of the drive shaft 15 and the main shaft 14 over which the change-speed gears are allowed to slide without providing any exclusive lubricating oil passageway.

The crankshaft lubricating system 55 has the following construction. A crankshaft oil passageway 55a is formed in the filter cover 47 in such a manner as to extend from a crankshaft side outlet 59c toward the lubricating oil pump 52, the oil passageway 55a is made to communicate with a communication bore 62a formed in a rotating shaft of the lubricating oil pump 52 in such a manner as to pass therethrough along the axial center thereof, and furthermore, the communication bore 62a is made to communicate with a crank shaft oil supply passageway 8e formed in the crankshaft 8 along the axial center thereof via a connecting pipe 64. Then, the crankshaft oil supply passageway 8e communicates with the interior of a pin bore 65a in a crank pin 65 via a branch hole 8f, and the pin hole 65a is made to open to a rotating surface of a needle bearing 7b at a bit end portion 7a of a connecting rod 7 via a branch hole 65b. Thus, lubricating oil that has been filtered by the oil filter 59 is supplied to the rotating surface of the needle bearing 7b.

The lubricating oil pump 52 has the following general construction. A pump compartment 61c is provided in a right case 61b of a two-piece casing made up of left and right cases 61a, 61b in such a manner as to set a relevant portion of the case further back from the rest, and rotor 63 is disposed rotationally within the pump compartment 61. The rotating shaft 62 is inserted and disposed so as to pass through the axial center of the rotor 63, and the rotating shaft 62 and the rotor 63 are fixed together with a pin 63a. Note that the oil pick-up passageway 58a and an oil discharge passageway 58b are connected to a pump compartment upstream side and a pump compartment downstream side of the left case 61a, respectively. In addition, reference numeral 66 denotes a relief valve for holding the discharge pressure of the lubricating oil pump 52 equal to or smaller than a predetermined value and the relief valve is adapted to relieve the pressure on the discharge side of the lubricating oil pump 52 toward the oil pick-up passageway 58a side when the pressure on the discharge side reaches or exceeds the predetermined value.

The rotating shaft 62 is a tubular shaft which passes through the pump case 61 in the axial direction and opens to the crank oil supply passageway 55a at a right end portion thereof as shown in the drawing. In addition, a power transmitting flange portion 62b is formed integrally at a left end portion of the rotating shaft 62 as shown in the drawing. The flange portion 62b faces a right end face of the crankshaft 8, and the flange portion 62b and the crankshaft 8 are connected together by an Oldham's coupling 67 in such a manner as to absorb a slight deviation of the centers of the shafts.

To describe in detail, the Oldham's shaft 67 is constructed such that a coupling plate 67a is disposed between the crankshaft 8 and the flange portion 62b, a pin 67b planted in the end face of the crankshaft 8 and a pin 67c planted in the flange portion 62b are inserted into a communicating bore 67d in the coupling plate 67a.

In addition, the connecting pipe 64 is such as to establish a communication between the right end opening of the crankshaft 8 and the left end opening of the rotating shaft 62, and a gap between inner circumferences of the crankshaft opening and the rotating shaft opening and an outer circumference of the connecting pipe 64 is sealed with an oil seal 64a.

Here, as has been described above, the crank compartment 2c is defined separately from the other transmission compartment 2d, the flywheel magnet compartment 9a and the clutch compartment 10a, whereby an oil return mechanism is constructed in which the pressure within the crank compartment 2c is fluctuated to be positive and negative as the piston 6 strokes, so that lubricating oil in the respective compartments is returned to the lubricating oil tank 51 by virtue of the pressure fluctuation.

To describe this in detail, a discharge port 2g and a suction or pick-up port 2h are formed in the crank compartment 2c. A discharge port reed valve 69 adapted to open when the pressure within the crank compartment is positive is disposed in the discharge port 2g, and a pick-up port reed valve 70 adapted to open when the pressure within the crank compartment is negative is disposed in the pick-up port 2h.

Then, the discharge port 2g communicates with the clutch compartment 10a from the crank compartment 2c via a communication bore 2i and then communicates with the transmission compartment 2d from the clutch compartment 10a via a communication bore 2j. Furthermore, the transmission compartment 2d communicates with the flywheel magnet compartment 9a via a communication bore 2k. A return port 2m formed so as to communicate with the flywheel magnet compartment 9a communicates with the lubricating oil tank 51 via a return hose 57c, an oil strainer 57d and a return hose 57e.

Here, a guide plate 2n is provided at the return port 2m. This guide plate 2n has a function to ensure the discharge of lubricating oil by modifying the return port 2m so as to provide a narrow gap a between a bottom plate 2p and itself and to secure a wide width b.

In addition, an oil separating mechanism is connected to the lubricating oil tank 51 for separating oil mists contained in the air within the tank by virtue of centrifugal force so as to return oil mists so separated to the crank compartment 2c. This oil separating mechanism has a construction in which an introduction hose 72a which is connected to an upper portion of the lubricating oil tank 51 at one end thereof is tangentially connected to an upper portion of a cone-shaped separating compartment 71 at the other end and a return hose 72b connected to a bottom portion of the separating compartment 71 is connected to the pick-up port 2h of the crank compartment 2c. Note that the air from which the oil mists are separated is discharged to the atmosphere via an exhaust hole 72c.

Thus, according to the embodiment, since the crank chamber 2c is made to be a substantially closed space so that the pressure therein fluctuates as the piston 6 reciprocates vertically, whereby lubricating oil that has flowed into the crank compartment 2c is sent back to the lubricating oil tank 51 by virtue of pressure fluctuation within the crank compartment 2c, the necessity of an exclusive oil sending pump (a scavenging pump) can be obviated, and hence the construction of the engine can be simplified and costs can be attempted to be reduced.

In addition, since the discharge port reed valve (an outlet side check valve) 69 adapted to open when the pressure in the crank compartment increases and to close when the pressure lowers is disposed in the vicinity of where the oil sending passageway is connected to the crank compartment 2c, the lubricating oil within the crank compartment 2c can be sent back to the lubricating oil storage tank 51 in a more ensured fashion.

In addition, since an portion above the oil level within the lubricating oil storage tank 51 is connected to the crank compartment 2 via the return hoses 72a, 72b and the discharge port reed valve (a pick-up side check valve) 70 adapted to open when the pressure in the crank compartment 2c lowers and to close when the pressure increases is provided in the vicinity where the return hoses are connected to the crank compartment 2c, air required is picked up into the crank compartment 2c when the piston 6 moves upwardly, whereas the inside pressure of the crank compartment 2c increases as the piston 6 lowers, whereby lubricating oil within the crank compartment 2c can be sent tout in a more ensured fashion.

Incidentally, in a case where there is provided no air supply path from the outside to the interior of the crank compartment 2c, only a negative pressure or a lower positive pressure is formed inside the crank compartment, this causing a concern that there occurs a case where oil cannot be sent out properly.

Furthermore, since the centrifugal lubricating oil mist separating mechanism 71 for separating lubricating oil mist is interposed at the intermediate position along the length of the return passageways 72a, 72b, so that lubricating oil mist so separated is returned to the crank compartment 2c via the return hose 72b, whereas air from which the mist content is removed is discharged to the atmosphere, only lubricating oil mist can be returned to the crank compartment, whereby the reduction in oil sending efficiency can be avoided which would occur when an excessive amount of air is allowed to flow into the crank compartment, thereby making it possible to send out lubricating oil in the crank compartment in an ensured fashion while preventing the atmospheric pollution.

In addition, since the lubricating oil pump 52 is connected to one end of the crankshaft 8 and the discharge port of the lubricating oil pump 52 is made to communicate with the crankshaft oil supply bore (an in-crankshaft oil supply passageway) 8e formed in the crankshaft 8 via a communicating bore (an in-pump oil supply passageway) 62e formed in the lubricating oil pump 52 and the connecting pipe 64, lubricating oil can be supplied to the parts needing lubrication of the crankshaft 8 with the simple and compact construction.

Additionally, since the crankshaft 8 and the lubricating oil pump 52 are connected with the Oldham's coupling 67 which can absorb the deviation in a direction normal to the axes of the shafts, the communication hole 62a and the crankshaft oil supply passageway 8e are made to communicate with each other via the connecting pipe 64, and the resilient O ring 64a is interposed between the connecting pipe 64, and the communication hole 62a and the crankshaft oil supply bore 8e, even in the event that a slight deviation in center takes places between the crankshaft 8 and the pump shaft 62, lubricating oil can be supplied to the parts needing lubrication without any problem, thereby making it possible to secure required lubricating properties.

INDUSTRIAL APPLICABILITY

According to the first aspect of the invention, since the space between the bolt bores of the left and right boss portions into which the connecting bolt is inserted and the connecting bolt is made to constitute the lubricating oil passageway and the lubricating oil supply holes directed to the change-speed gears are formed in the boss portions in such a manner as to branch off from the lubricating the oil passageway, lubricating oil can be supplied to the meshing surfaces of the change-speed gears without providing, for example, an exclusive lubricating oil passageway, and the space where the system is arranged is made smaller in size when compared with a case where, for example, an exclusive lubricating pipe is provided, and as a result, the enlargement of the crankcase can be avoided. In addition, since the left and right boss portions are extended in the tubular fashion so as to be brought into abutment with each other face-to-face and the left and right case portions are connected together with the connecting bolt that is inserted thereinto, the connecting force of the laterally separable crankcase can, as a result, be enhanced without a risk that the side walls of the left and right case portions are deformed by virtue of the connecting force. In addition, since the connecting bolt and the boss portions are disposed in the vicinity of the main shaft and the drive shaft, the crankcase is connected together at the portions in the vicinity of the shafts, and the connecting force of the left and right case portions can be enhanced from this point of view.

According to the second aspect of the invention, since the connecting bolt and the tubular boss portions are disposed above the intermediate portions of the main shaft and the drive shaft and the lubricating oil supply holes are formed so as to be directed toward the change-speed gears on the main shaft and the drive shaft, lubricating oil can be supplied to the change-speed gears on both the main shaft and the drive shaft by the single lubricating oil passageway. In addition, since the connecting bolt is disposed between the gears on the both shafts, the connecting bolt is allowed to be made close to the both shafts, thereby making it possible to make the crankcase smaller in size.

According to the third aspect of the invention, since the head portion of the connecting bolt is situated in the clutch compartment, even in case lubricating oil leaks from the gap between the head portion of the connecting bolt and the seat surface, the lubricating oil that has so leaked falls into the clutch compartment, causing no problem.

According to the fourth aspect of the invention, since the lubricating oil supply port is formed in the screwed side of the connecting bolt, whereas the lubricating oil discharge port is formed in the head portion side thereof, the lubricating oil supply port side where the pressure of lubricating oil in the lubricating oil passageway is high is completely closed, while since the pressure of lubricating oil is low which resides on the discharge port side where there exists a possibility of lubricating oil leaking from the gap between the head portion of the connecting bolt and the seat surface, the amount of lubricating oil that will leak can be suppressed.

According to the fifth aspect of the invention, since the portion of the bolt bore which is situated immediately close to the head portion of the connecting bolt is formed smaller in diameter so that the gap between the portion and the connecting bolt becomes narrower than the one along the portion thereof which correspond to the lubricating oil passageway, the seat surface with which the head portion of the connecting bolt is brought into abutment can be easily secured, and the amount of lubricating oil that will leak can be suppressed.

According to the sixth aspect of the invention, since the lubricating oil discharge port is made to communicate with the in-drive shaft lubricating oil passageway, and a formed within the drive shaft and according to the seventh aspect of the invention, since the lubricating oil supply port side portion of the lubricating oil passageway is made to communicate with the in-main shaft lubricating oil passageway, lubricating oil can be supplied to the sliding surfaces of the drive shaft and the main shaft over which the change-speed gears are allowed to slide without providing an exclusive lubricating oil supply passageway.

The invention claimed is:

1. An engine lubrication system in which a transmission having a main shaft and a drive shaft each having a plurality of change-speed gears mounted thereon is arranged within a crankcase formed of left and right case portions, comprising:
   a connecting bolt for connecting the left and right case portions and disposed in parallel with the shafts; and
   left and right boss portions having bolt bores, into which the connecting bolt for connecting the left and right case portions is inserted, extended in a tubular fashion so as to abut with each other,
   wherein a space between an inner circumferential surface of the bolt bore in the left and right boss portions and an outer circumferential surface of the connecting bolt is made to constitute a lubricating oil passageway,
   an end of the lubricating oil passageway is connected to a lubricating oil supply source,
   lubricating oil supply holes directed to the change-speed gears of the transmission are formed in the boss portions in such a manner as to branch off from the lubricating oil supply passageway, and
   wherein the connecting bolt and the boss portions are disposed above a position between the main shaft and the drive shaft, and the lubricating oil supply holes are formed so as to be directed toward the change-speed gears on the main shaft and the drive shaft.

2. An engine lubrication system as set forth in claim 1, wherein the connecting bolt is inserted from a side where a clutch compartment for accommodating therein a clutch mechanism resides so as to be screwed into a wall surface of an opposed case portion, with a head portion of the connecting bolt being situated on a clutch compartment side.

3. An engine lubrication system as set forth in claim 2, wherein a lubricating oil supply port is formed in a screwed side of the connecting bolt, whereas a lubricating oil discharge port is formed in a head portion side of the connecting bolt.

4. An engine lubrication system as set forth in claim 3, wherein a portion of the bolt bore which is adjacent to the head portion of the connecting bolt is formed smaller in diameter so that a gap between that portion and the connecting bolt becomes narrower than a gap between other portion of the bolt bore and the connecting bolt, which correspond to the lubricating oil passageway.

5. An engine lubrication system as set forth in claim 4, wherein the lubricating oil discharge port is made to communicate with an in-drive shaft lubricating oil passageway formed within the drive shaft and the in-drive shaft lubricating oil passageway is made to communicate with sliding surfaces of the change-speed gears through a lubricating oil supply hole.

6. An engine lubrication system as set forth in claim 5, wherein a lubricating oil supply port side portion of the lubricating oil passageway is made to communicate with an in-main shaft lubricating oil passageway formed within the main shaft and in that the in-main shaft lubricating oil passageway is made to communicate with the sliding surfaces of the change-speed gears through a lubricating oil supply hole.

* * * * *